US009600000B2

(12) United States Patent
Vau

(10) Patent No.: US 9,600,000 B2
(45) Date of Patent: Mar. 21, 2017

(54) METHOD AND DEVICE FOR ACTIVE CONTROL OF MECHANICAL VIBRATIONS BY IMPLEMENTATION OF A CONTROL LAW CONSISTING OF A CENTRAL CORRECTOR AND A YOULA PARAMETER

(75) Inventor: Bernard Vau, Saint Maur des Fosses (FR)

(73) Assignee: IXBLUE, Marly le Roi (FR)

( * ) Notice: Subject to any disclaimer, the term of this patent is extended or adjusted under 35 U.S.C. 154(b) by 869 days.

(21) Appl. No.: 13/885,411

(22) PCT Filed: Nov. 16, 2011

(86) PCT No.: PCT/FR2011/052656
§ 371 (c)(1),
(2), (4) Date: May 15, 2013

(87) PCT Pub. No.: WO2012/066233
PCT Pub. Date: May 24, 2012

(65) Prior Publication Data
US 2013/0238146 A1 Sep. 12, 2013

(30) Foreign Application Priority Data

Nov. 16, 2010 (FR) ...................... 10 59419

(51) Int. Cl.
G05D 19/02 (2006.01)
F16F 15/00 (2006.01)
G05B 13/02 (2006.01)
(52) U.S. Cl.
CPC ........... *G05D 19/02* (2013.01); *F16F 15/002* (2013.01); *G05B 13/025* (2013.01)

(58) Field of Classification Search
CPC ...... G05D 19/02; F16F 15/002; G05B 13/025
(Continued)

(56) References Cited

U.S. PATENT DOCUMENTS 5,404,418 A * 4/1995 Nagano ................. G05B 19/19
388/806
6,002,778 A * 12/1999 Rossetti ............. G10K 11/1786
381/71.12

(Continued)

OTHER PUBLICATIONS

Landau Ioan, "Adaptive regulation—Rejection of unknown maltiple narrow band disturbances", Jun. 24-26, 2009, IEEE, pp. 1056-1065.*

(Continued)

*Primary Examiner* — Miranda Huang
*Assistant Examiner* — Alan Chu
(74) *Attorney, Agent, or Firm* — Young & Thompson

(57) ABSTRACT

A method and a device are based on the application of an active correcting system with central corrector and Youla parameter for the attenuation of essentially monofrequency mechanical vibratory perturbations generated in a material structure by a rotating machine. Previously, a control law corresponding to a block modeling of the system is established and calculated, the blocks being, on the other hand, those of the central corrector and, on the other hand, a Youla parameter block, the modeling being such that only the Youla parameter, in the form of an infinite impulse response filter, has coefficients dependent on the vibratory perturbation frequency. During a phase of use, in real time, the frequency of the current perturbation is determined and the control law is calculated using for the Youla parameter the stored coefficients of a determined perturbation frequency corresponding to the current perturbation frequency.

16 Claims, 7 Drawing Sheets

Series mounting

(58) Field of Classification Search
USPC .......................................................... 700/280
See application file for complete search history.

(56) References Cited

U.S. PATENT DOCUMENTS

| | | | | |
|---|---|---|---|---|
| 6,473,720 | B1* | 10/2002 | Hampson | G05B 23/0235 700/97 |
| 7,254,475 | B1* | 8/2007 | Grai | F02D 35/021 701/111 |
| 2004/0050999 | A1* | 3/2004 | Hill | G05D 19/02 244/17.27 |
| 2010/0239105 | A1* | 9/2010 | Pan | G10K 11/1782 381/94.9 |

OTHER PUBLICATIONS

International Search Report dated Apr. 20, 2012, corresponding to PCT/FR2011/052656.
I.O. Landau, A. Costantinescu D. Rey:; "Adaptive Narrow Band Disturbance Rejection Applied to an Active Suspension—An Internal Model Principle Approach"; Jan. 24, 2005; pp. 563-574; XP002647858.
"La Mecatronique Innovante"; Supmeca, Saint-Ouen, France, Dec. 16, 2009; XP0026475919 (English language summary provided in supplemental IDS transmittal).
Sophie Glevarec (Ponchaud) et al.; "Attenuation des Ondulations de Couple Sur Simulateurs de Mouvements"; Dec. 15, 2009; XP002647612 (English language summary provided in supplemental IDS transmittal).

* cited by examiner

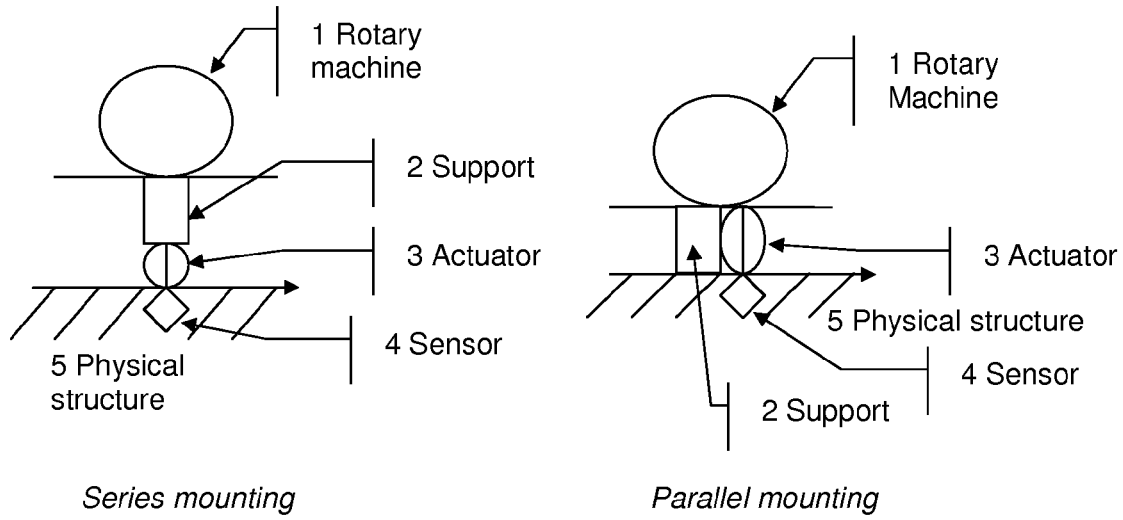
Series mounting
Parallel mounting
FIGURE 1
FIGURE 2
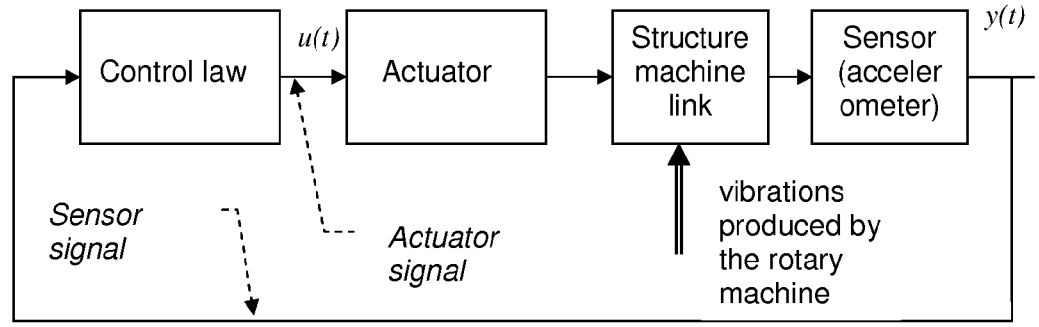
FIGURE 3
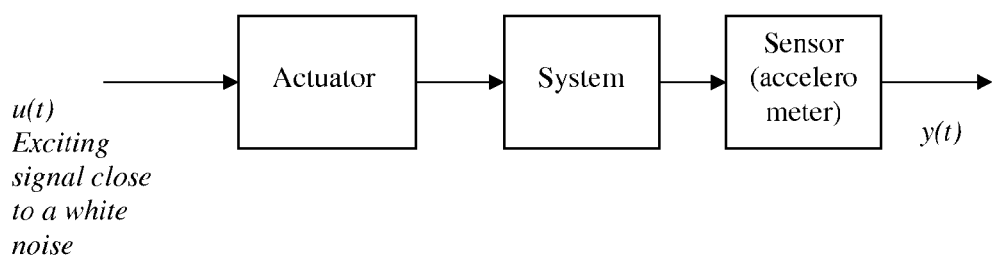
FIGURE 4

METHOD AND DEVICE FOR ACTIVE CONTROL OF MECHANICAL VIBRATIONS BY IMPLEMENTATION OF A CONTROL LAW CONSISTING OF A CENTRAL CORRECTOR AND A YOULA PARAMETER

BACKGROUND OF THE INVENTION

Field of the Invention

The present invention relates to a method and a device for active control of mechanical vibrations by implementation of a control law consisted of a central corrector and a Youla parameter.

Description of the Related Art

There exist many industrial cases of use of rotary machines. Such machines always produce vibrations that are transmitted to the physical structures to which they are fixed through fixation supports connecting the rotary machine to its physical structure. The rotary character of the above-mentioned machines leads in that the spectrum of the transmitted vibrations has peaks at frequencies proportional to the speed of rotation of the rotary axis. Such vibrations are often caused by the unbalance of the rotary axis, i.e. an out-of-balance defect of the rotary axis. In the frequency domain, the peaks observed in the spectrum of the transmitted vibrations have frequencies in Hertz that are equal to the speed of rotation of the axis in revolutions per second or to the multiples thereof (harmonics).

The reduction of the vibrations has long been obtained by application of passive methods. That is why, generally, the rotary machine is fixed to the physical structure through a support including one or more elastics pads that have a passive damping effect. Nevertheless, for reasons of fixation strength, it is not possible to make these pads very supple, and thus very damping, which necessarily causes a limitation of the isolation produced by these pads often made of elastomer.

The document "Atténuation des ondulations de couple sur simulateurs de mouvements" of Sophie Glévarec (Ponchaud) and Bernard Vau, Conference on Mechatronic, Sup-Méca, Saint-Ouen, Dec. 15, 2009, discloses a means for controlling mechanical vibrations.

BRIEF SUMMARY OF THE INVENTION

The present invention describes a particular application of active control within the framework of vibratory isolation of rotary machines, the speed of rotation of the machine axis being known or being determinable and being variable.

A typical example of implementation is that of the isolation of an airplane cockpit with respect to the vibrations generated by the engine out of balance. The invention may however be implemented in any other field in which a rotary machine creates vibratory mechanical perturbations liable to be transmitted to a physical structure to which the rotary machine is connected and which is desired to be attenuated or eliminated.

There exist two main principle schemes of structures for active control of physical systems.

Firstly, the feed-forward control structure. This structure requires an actuator, an error sensor at which it is searched to cancel the vibration, a controller as well as a reference signal, correlated with the signal to be cancelled. This structure has in particular given rise to a series of algorithms based on the least mean squares (LMS): Fx LMS, FR-LMS, whose purpose is to minimize within the meaning of the least mean squares the signal coming from the error sensor, and that as a function of the reference signal.

Secondly, the feedback control structure. This structure requires no reference signal as it is the case for the feed-forward control structure. It is then a conventional feedback control structure, and all the tools of the conventional automatic control engineering (measurement of robustness, analysis of stability, performances) can be used. In particular, an analysis of robustness of the closed-loop system with respect to the transfer function variation of the mechanical system elements may be performed. The frequency behavior of the system may also be studied, not only at the frequency of rejection of the perturbation, but also at the other frequencies. This is this feedback control structure that is at the basis of the present invention.

For more information about these two types of active control, reference may be made to the reference book "Signal processing for active control" of S-J Eliott, Academic Press, San Diego (2001).

It is therefore proposed, within the framework of an active engine-physical structure vibratory isolation, to implement an active control with an actuator intended to counteract the vibrations produced by the rotary machine and that is installed in relation with the support of fixation of the rotary machine to the physical structure on which it is installed, wherein the actuator can be placed in series or in parallel with the support. Preferably, the actuator is electromechanical and the control signal of the actuator is electric, and several technologies exist, including, among others, the electrodynamic or the piezoelectric technologies. In other modalities, the actuator implements a fluid such as an oil, whose pressure is varied as a function of a control signal. In all the cases, a calculator produces initially a control signal that is electric, of the digital or analog type, and that will thus be either transmitted directly to the actuator, or converted into a fluid signal by electric to fluid (oleo/hydro) signal converters. It is understood that in this latter case, the modeling and simulation/calculations that will be seen will take this conversion into account. A sensor is also implemented, which is intended to measure the vibrations and at the level of which the vibrations will be reduced by application of the active corrector. This sensor is generally an accelerometer. The particular position of the sensor will be able to be optimized as a function of the context and in particular of the mechanical behavior of all the physical elements concerned. If most of time the sensor will be in direct relation with the support of fixation on the latter or, preferably, on the physical structure, in other cases, it is placed in other positions, on the rotary machine or farther on the physical structure. Finally, the purpose of the active vibratory isolation proposed is to reduce the intensity of the vibrations at the level of the physical structure to which the rotary machine is fixed my means of supports.

The invention thus relates to a method for active control of mechanical vibrations by implementation of a control law consisted of a central corrector and a Youla parameter for the attenuation of essentially mono-frequency mechanical vibratory perturbations created in a physical structure of a physical system by at least one rotary machine fixed by a support to said physical structure and rotating at a determinable speed of rotation, the frequency of the vibratory perturbation being linked to the speed of rotation of the rotary machine and varying as a function of the variations of said speed of rotation, at least one mechanical actuator being arranged between the rotary machine and the physical structure, as well as at least one vibration sensor producing signals y(t) or Y(t) according to a mono-variable or multi-variable case, respectively, the use of one sensor corresponding to a mono-variable case and the use of several sensors corresponding to a multi-variable case, wherein the actuator(s) can be in series, in the support, or in parallel with the support, the sensor(s) being connected to at least one calculator controlling the actuator(s), the calculator including correction calculation means producing control signals u(t) or U(t) according to a mono-variable or multi-variable case, respectively, for the actuator(s) as a function, on the one hand, of measurements of the sensor(s), and on the other hand, of a vibratory perturbation frequency parameter, the calculation means being configured according to a correction control law corresponding to a block-modeling of the system, said blocks being, on the one hand, those of the central corrector, and on the other hand, a Youla parameter block, the modeling being such that only the Youla parameter has coefficients that depend on the vibratory perturbation frequency in said correction control law, the central corrector having fixed coefficients, the Youla parameter being in the form of an infinite impulse response filter, and during a preliminary design phase, are determined and calculated, on the one hand, the model parameters of the physical system part that includes the actuator(s), support(s) and sensor(s) by stimulation of the actuator(s) and measurements by the sensor(s), and on the other hand, the correction control law as a function of the determined frequencies of vibratory perturbations, and at least the variable coefficients of the Youla parameters are stored in a memory of the calculator, preferably in a table, and during a use phase, in real time:

the frequency of the current vibratory perturbation is determined, the correction control law is calculated, comprising the central corrector with the Youla parameter, with the calculator using as the Youla parameter the memorized coefficients of a determined perturbation frequency corresponding to the current perturbation frequency.

In various embodiments of the invention, the following means are employed, which can be used either alone or in any technically possible combination:

the calculator is a digital calculator, in particular with a digital signal processor (DSP), the parameters of the central corrector are also stored in a memory of the calculator during the preliminary design phase, the vibration sensor is located on the physical structure, the vibration sensor is located at the interface between the fixation support and the physical structure, the vibration sensor is located on the physical structure, in direct relation with the support, the vibration sensor is located on the support, a calculator is implemented for each rotary machine, a calculator is implemented for several rotary machines, the correction calculations for each rotary machine being independent from each other (independent parallel calculations), the physical structure includes more than one rotary machine, each of the rotary machines includes its corrector, actuator(s) and sensor(s), the mechanical actuator is an electro-mechanical actuator, wherein the control of the actuator is electric, the mechanical actuator is a hydro-mechanical actuator, wherein the control of the actuator is hydraulic, a converter being arranged between the actuator and the calculator producing an electric control, the physical system is an aircraft, the rotary machine is an aircraft engine, the aircraft engine is a propulsion engine, the aircraft engine is an energy generating engine, including electric energy, the aircraft is a plane, helicopter, the physical structure is an aircraft cell, the physical structure is a plane wing, the sensor is an accelerometer, the support includes a vibratory isolator, the vibratory isolator is of the "Silentbloc" type, in the mono-variable case, in the design phase:

a)—in a first time, a linear model of the physical system is used, which is in the form of a discrete rational transfer function, and said transfer function is determined and calculated by stimulation of the physical system by the actuator(s) and measurements by the sensor, then application of a linear system identification method with the measures and the model, b)—in a second time, a central corrector is implemented, which is applied to the model of the physical system determined and calculated at the first time, the central corrector being in the form of a RS corrector of two blocks $1/So(q^{-1})$ and $Ro(q^{-1})$, in the central corrector, the block $1/So(q^{-1})$ producing the signal u(t) and receiving as an input the reverse output signal of the block $Ro(q^{-1})$, said block $Ro(q^{-1})$ receiving as an input the signal y(t) corresponding to the summation of the vibratory perturbation p(t) and of the output of the transfer function of the physical system model, and the central corrector is determined and calculated, c)—in a third time, a Youla parameter is added to the central corrector to form the correction control law, the Youla parameter being in the form of a block $Q(q^{-1})$, an infinite impulse response filter, with $$Q(q^{-1}) = \frac{\beta(q^{-1})}{\alpha(q^{-1})},$$

$\alpha$ and $\beta$ being polynomials in $q^{-1}$, added to the central corrector RS, said Youla block $Q(q^{-1})$ receiving a perturbation estimation obtained by calculation from signals u(t) and y(t) and as a function of the transfer function of the physical system model and the output signal of said Youla block $Q(q^{-1})$ being subtracted from the reverse signal of $Ro(q^{-1})$ sent at the input of the block $1/So(q^{-1})$ of the central corrector RS, and then is determined and calculated the Youla parameter in the correction control law, including the central corrector to which the Youla parameter is associated, for at least one vibratory perturbation frequency p(t), including at least the determined frequency of the vibratory perturbation to be attenuated, and in the use phase, in real time:

the current frequency of the vibratory perturbation to be attenuated is determined, the calculator is caused to calculate the correction control law, comprising the RS corrector with the Youla parameter, using as the Youla parameter the coefficients that have been calculated for a vibratory perturbation frequency corresponding to the current frequency of vibratory perturbation to be attenuated, the coefficients of $Ro(q^{-1})$ and $So(q^{-1})$ being fixed, in the design phase, the following operations are performed:
- a)—in a first time, the physical system is excited by application to the actuator(s) of an excitation signal, whose spectral density is substantially uniform over a useful frequency band,
- b)—in a second time, the polynomials $Ro(q^{-1})$ and $So(q^{-1})$ of the central corrector are determined and calculated so that said central corrector is equivalent to a corrector calculated by placement of the poles of the closed loop in the application of the central corrector to the transfer function of the physical system model,
- c)—in the third time, are determined and calculated the numerator and denominator of the Youla block $Q(q^{-1})$ within the correction control law, for at least one vibratory perturbation frequency p(t), including at least the determined frequency of vibratory perturbation to be attenuated, and that as a function of a criterion of attenuation, the block $Q(q^{-1})$ being expressed in the form of a ratio $\beta(q^{-1})/\alpha(q^{-1})$, $\alpha$ and $\beta$ being polynomials in $q^{-1}$, so as to obtain coefficient values of the polynomials $\alpha(q^{-1})$ and $\beta(q^-)$ for the/each of the frequencies, the calculation of $\beta(q^-)$ and $\alpha(q^{-1})$ being made by obtaining a discrete transfer function Hs $(q^{-1})/\alpha(q^{-1})$ resulting from the discretization of a continuous second order cell, the polynomial $\beta(q^-)$ being calculated by solving a Bezout equation, and in the use phase, in real time, the following operations are performed: the current frequency of the vibratory perturbation to be attenuated is determined, and the calculator is caused to calculate the correction control law, fixed-coefficient central corrector with variable-coefficient Youla parameter, to produce the signal u(t) sent to the actuator(s), as a function of the measures y(t) of the sensor and using as the Youla block $Q(q^{-1})$ the coefficient values of the polynomials $\alpha(q^{-1})$ and $\beta(q^-)$ determined and calculated for a determined frequency corresponding to the current frequency, as the physical system model, a transfer function is used, which is in the form of:

$$\frac{y(t)}{u(t)} = \frac{q^{-d} B(q^{-1})}{A(q^{-1})}$$

where d is the number of system delay sampling periods, B and A are polynomials in $q^{-1}$ of the form:

$$B(q^{-1}) = b_0 + b_1^* \cdot q^{-1} + \ldots b_{nb} \cdot q^{-nb}$$

$$A(q^{-1}) = 1 + a_1 \cdot q^{-1} + \ldots a_{na} \cdot q^{-na}$$

the $b_i$ and $a_i$ being scalar numbers, and $q^{-1}$ being the delay operator of a sampling period, and the calculation of the vibratory perturbation estimation is obtained by application of the function $q^{-d} B(q^{-1})$ to u(t) and subtraction of result from the application of y(t) to the function $A(q^{-1})$.

for the time b), the polynomials $Ro(q^{-1})$ and $So(q^{-1})$ of the central corrector are determined and calculated by a method of placement of the closed loop poles, in the mono- and multi-variable case, in the design phase:
- a)—in a first time, a linear model of the physical system is used, which is in the form of a state representation of matrix blocks H, W, G and $q^{-1} \cdot I$, G being a transition matrix, H being an input matrix, W being an output matrix and I the identity matrix, wherein said state representation can be expressed by a recurrence equation:

$$X(t+Te) = G \cdot X(t) + H \cdot U(t)$$

$$Y(t) = W \cdot X(t)$$

with X(t): state vector, U(t): input vector, Y(t): output vector, and said physical system model is determined and calculated by stimulation of the physical system by the actuator(s) and measurements by the sensors, then application of a linear system identification method with the measures and the model,

- b)—in a second time, a central corrector is implemented, which is applied to the physical system model determined and calculated at the first time, the central corrector being in the form of state observer and estimated state feedback that expresses iteratively $\hat{X}$, a state vector of the observer, as a function of $Kf$, a gain of the observer, Kc a vector of the estimated state feedback, as well as the physical system model determined and calculated at the first time, i.e.:

$$\hat{X}(t+Te) = (G - Kf \cdot W) \cdot \hat{X}(t+Te) + H \cdot U(k) + Kf \cdot (Y(t+Te))$$

with a control $U(t) = -Kc \cdot \hat{X}(t)$, and said central corrector is determined and calculated,

- c)—in a third time, a Youla parameter is added to the central corrector to form the correction control law, the Youla parameter being in the form of a mono- or multi-variable block Q, of state matrices $A_Q$, $B_Q$, $C_Q$, added to the central corrector also expressed in a state representation form, block Q whose output subtracted from the output of the central corrector produces the signal U(t) and whose input receives the signal Y(t) from which is subtracted the signal $W \cdot \hat{X}(t)$, and then is determined and calculated the Youla parameter in the correction control law, including the central corrector to which the Youla parameter is associated, for at least one vibratory perturbation frequency P(t), including at least the determined frequency of vibratory perturbation to be attenuated, and in the use phase, in real time:
the current frequency of the vibratory perturbation to be attenuated is determined,
the calculator is caused to calculate the correction control law, including the fixed-coefficient central corrector with the variable-coefficient Youla parameter, using as the Youla parameter the coefficients that have been calculated for a vibratory perturbation frequency corresponding to the current frequency of vibratory perturbation to be attenuated, is the state vector of the Youla parameter at the time instant t, in the design phase, the following operations are performed:
- a)—in a first time, the physical system is excited by application to the actuators of excitation signals, whose spectral density is substantially uniform over a useful frequency band, the excitation signals being decorrelated with respect to each other,
- b)—in a second time, the central corrector is determined and calculated so as to be equivalent to a corrector with state observer and state feedback, $Kf$ being obtained by quadratic optimization (LQ), and the state feedback gain Kc chosen so as to ensure the robustness of the control law provided with the Youla parameter, by means of a quadratic optimization (LQ), c)—in the third time, are determined and calculated the coefficients of the Youla block Q within the correction control law, for at least one vibratory perturbation frequency P(t), including at least the determined frequency of vibratory perturbation to be attenuated as a function of a criterion of attenuation, so as to obtain coefficient values of the Youla parameter for the/each of the frequencies, and in the use phase, in real time, the following operations are performed:

the current frequency of the vibratory perturbation to be attenuated is determined, and the calculator is caused to calculate the correction control law, fixed-coefficient central corrector with variable-coefficient Youla parameter, to produce the signal U(t) sent to the actuators, as a function of the measures Y(t) of the sensors and using as the Youla parameter the coefficient values determined and calculated for a determined frequency corresponding to the current frequency.

the application is adapted to a set of determined frequencies of vibratory perturbations to be attenuated, and the time c) is repeated for each of the determined frequencies and, in use phase, when no one of the determined frequencies corresponds to the current frequency of vibratory perturbation to be attenuated, an interpolation is made at said current frequency, for the coefficient values of the Youla block Q, based on the values of coefficients of said Youla block Q known for the determined frequencies, the signals are sampled at a frequency Fe and, at time a), a useful frequency band of the excitation signal is used, which is substantially [0, Fe/2], before the use phase, at the design phase, it is added a fourth time d) of verification of the stability and robustness of the physical system model and of the correction control law, central corrector with Youla parameter, previously obtained at times a) to c), by making a simulation of the correction control law obtained at times b) and c), applied to the physical system model obtained at time a), for the determined frequency(ies) and when a predetermined criterion of stability and/or robustness is not fulfilled, at least the time c) is reiterated with modification of the criterion of attenuation, the design phase is a preliminary phase and is performed once, preliminary to the use phase, with memorization of the determination and calculation results for being used in the use phase, the current frequency of the vibratory perturbation to be attenuated is determined from the measure of the speed of rotation of the rotary machine, the method is implemented for attenuating only one mechanical vibratory perturbation frequency at a time, the method is implemented for attenuating two or more mechanical vibratory perturbation frequencies at a time.

The calculator is a programmable calculator and the invention also relates to an instruction medium for controlling directly or indirectly the calculator so that it operates according the invention, and in particular in real time in the use phase.

The invention also relates to an application of an active corrector system with central corrector and Youla parameter to the attenuation of mechanical vibratory perturbations, based on the methods presented.

The invention also relates to a device for attenuation of vibratory perturbations including physical means specifically structured and configured for the execution of the method presented. More precisely, the invention relates in particular to a device including means for active control of mechanical vibrations by implementation of a control law consisted of a central corrector and a Youla parameter for the implementation of the method according to any one of the preceding claims for attenuation of essentially mono-frequency mechanical vibratory perturbations created in a physical structure of a physical system by at least one rotary machine fixed by a support to said physical structure and rotating at a determinable speed of rotation, the frequency of the vibratory perturbation being linked to the speed of rotation of the rotary machine and varying as a function of the variations of said speed of rotation, the device further including at least one mechanical actuator arranged between the rotary machine and the physical structure, as well as at least one vibration sensor producing signals y(t) or Y(t) according to a mono-variable or multi-variable case, respectively, the use of one sensor corresponding to a mono-variable case and the use of several sensors corresponding to a multi-variable case, wherein the actuator(s) can be in series, in the support, or in parallel with the support, the sensor(s) being connected to at least one calculator of the device controlling the actuator(s), the calculator including correction calculation means producing control signal u(t) or U(t) according to a mono-variable or multi-variable case, respectively, for the actuator(s) as a function, on the one hand, of measurements of the sensor(s), and on the other hand, of a vibratory perturbation frequency parameter, the calculator including calculation means configured according to a correction control law corresponding to a block-modeling of the system, said blocks being, on the one hand, those of the central corrector, and on the other hand, a Youla parameter block, the modeling being such that only the Youla parameter has coefficients that depend on the vibratory perturbation frequency in said correction control law, the central corrector having fixed coefficients, the Youla parameter being in the form of an infinite impulse response filter, during a preliminary design phase, having been determined and calculated, on the one hand, the model parameters of the physical system part that includes the actuator(s), support(s) and sensor(s) by stimulation of the actuator(s) and measurements by the sensor(s), and on the other hand, the correction control law as a function of the determined frequencies of vibratory perturbations, and at least the variable coefficients of the Youla parameters are stored in a memory of the calculator, preferably in a table, the device allowing, during a use phase, in real time, the determination of the frequency of the current vibratory perturbation and the calculation of the correction control law, including the central corrector with the Youla parameter, with the calculator using as the Youla parameter the memorized coefficients of a determined perturbation frequency corresponding to the current perturbation frequency.

The device essentially includes means for active control of mechanical vibrations, at least one mechanical actuator, at least one vibration sensor and at least one calculator.

BRIEF DESCRIPTION OF THE DRAWINGS

The present invention, without being limited thereby, will now be exemplified by the following description, in relation with:

FIG. 1, which schematically shows a first mounting possibility, in series, of the actuator with respect to the support of the rotary machine, FIG. 2, which schematically shows a second mounting possibility, in parallel, of the actuator with respect to the support of the rotary machine, FIG. 3, which schematically shows the application of the control law with a loop between actuator and sensor in relation with a rotary machine connected by a support to a physical structure, FIG. 4, which schematically shows the time of stimulation of the real physical system intended to determine and calculate the model thereof in the form of a transfer function, an excitation signal u(t) of spectrum close to a white noise being sent to the actuator, FIG. 5, which shows a RST system looped to the physical system model, with T=0 and in the mono-variable case, FIG. 6, which shows a mono-variable case of RST corrector with T=0 and to which has been added a Youla parameter, looped to the physical system model, FIG. 7, which shows a complete diagram of the correction control law with a RS-type central corrector to which has been added a Youla parameter and allowing real time calculations in the use phase for vibratory perturbation attenuation, FIG. 8, which shows a diagram of the transfer on a two-actuator and two-sensor system, thus in the multi-variable case, FIG. 9, which shows in the form of a block diagram the system to be controlled, i.e. the model of the rotary-machine physical system in the multi-variable case, FIG. 10, which shows in the form of a block diagram the central corrector in the multi-variable case, FIG. 11, which shows in the form of a block diagram the central corrector applied to the physical system model in the multi-variable case, FIG. 12, which shows in the form of a block diagram the correction control law, central corrector+Youla parameter, applied to the physical system model in the multi-variable case, and FIG. 13, which shows in the form of a block diagram the correction control law, central corrector+Youla parameter, as used in real time for the vibratory perturbation attenuation, in the multi-variable case.

DETAILED DESCRIPTION OF THE PREFERRED EMBODIMENTS

Figure 5:
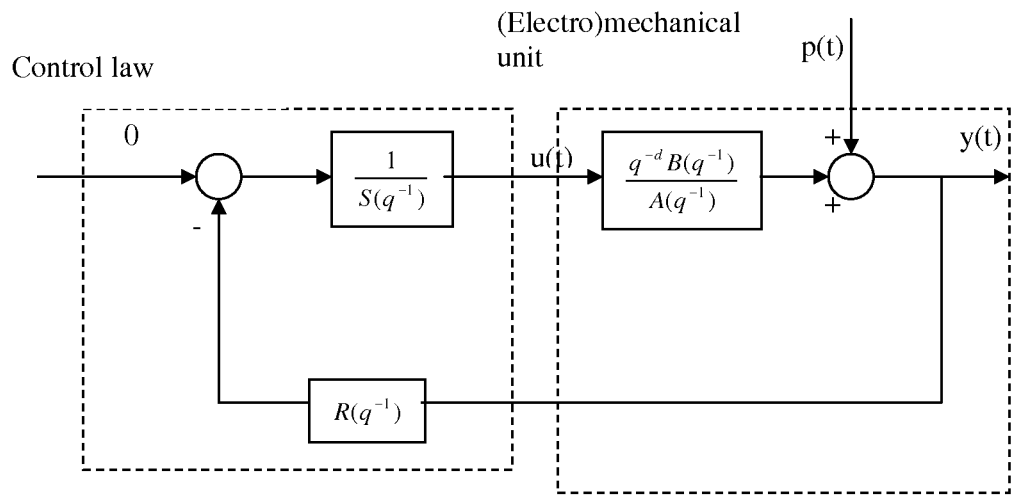

In the following, a device for active control of vibrations for active isolation of rotary machines is presented. The rotary machine 1 is connected to a physical structure 5 by means of one or several fixation supports 2 including or not vibration mechanical damping means of the "Silentbloc" type or other. The device is consisted of at least one sensor 4 and one or several actuators 3 integrated in the rotary machine support(s), cf. series mounting in FIG. 1, or in parallel with the rotary machine support(s), cf. parallel mounting in FIG. 2.

In FIGS. 1 and 2, the diagram is simplified with only one actuator and only one sensor for the single support shown. In practice, the rotary machine may be connected to the physical structure by several supports and each support may include one or several actuators. Preferably, it is implemented one sensor per support, sensor that is on the physical structure but in direct relation with the support, for example on the means for fixing the support to the physical structure. The support is generally a damping passive pad. In variants, a series+parallel mounting of actuators on a same support is implemented.

The actuators are controlled by a calculator configured with a control law that elaborates control signals from the signal received from the sensor(s) and as a function of the frequency of the vibratory perturbation that is to be reduced or eliminated and that is in relation with the speed of rotation of the rotary machine. The case will be considered of a digital calculator with sampling of acquired analog signals and conversions into analog mode, as the sensors and actuators usually work in analog mode, wherein the information about the vibratory perturbation frequency and/or the speed of rotation of the rotary machine can be initially analog or digital information.

It is to be noted that, on some of the figures, the term "(electro)-mechanical unit" has been used to mean that the physical system with the rotary machine, the support(s) for the fixation to the physical structure and the sensor, includes a preferentially electrically-controlled actuator but that this control may be of the fluidic type as a variant.

The way the proposed control law has been obtained and the application thereof to various cases will now be explained. In particular, the structure of the control law as well as the methodology intended to adjust this control law will be described.

The diagram of application of the control law that amounts to establish a loop between actuator(s) and sensor(s) in relation with a rotary machine connected by a support to a physical structure is shown in FIG. 3. The control signal of the actuator is denoted u(t) and the signal coming from the sensor is denoted y(t). The support may be more or less complex and correspond to one or several mechanical links between the rotary machine and the support.

The objective is to reject a mono-frequency vibratory perturbation whose frequency is supposed to be known thanks to the information about the speed of rotation of the rotary machine, given for example by a tachometer. Indeed, the frequency of the vibratory perturbation corresponds to the frequency of rotation of the rotary machine or to a multiple of the latter.

In order to synthetize a control law, it is necessary to have a model of the physical system consisted of the various elements that make it up, i.e. of the rotary machine mounted on the physical structure by means of one/several fixation supports and the actuator(s), associated sensor(s). This model has to be in the form of a discrete, rational transfer function (i.e. an infinite impulse response filter), with the calculator working at the period Te (in seconds) and the frequency Fe=1/Te (in Hertz). The linear approximation of the system is justified taking into the level of the signals involved. The order of the transfer function of the model has a dimension that is small enough not to lead to a too high volume of calculations, but great enough to correctly approximate the model. For that purpose, the over-sampling is to be avoided.

This transfer function describes the behavior of the physical system between the points u(t), actuator control signal, and y(t), signal measured by the sensor with no loop.

Let's $q^{-1}$ be the delay operator. The searched transfer function is of the form:

$$\frac{y(t)}{u(t)} = \frac{q^{-d} B(q^{-1})}{A(q^{-1})}$$

The identification allowing the calculation of the transfer function for the physical system considered is made by stimulating the system with a signal u(t), whose spectrum is close to that of a white-noise-type vibration, over a frequency range [0,Fe/2], wherein Fe/2 is the Nyquist frequency.

Such an excitation signal may be produced for example by a PRBS (Pseudo-random binary sequence). In practice, the actuator is excited with a signal u(t) close to a white noise, as shown in FIG. 4.

This stimulation may be performed in the absence of a perturbing outer vibration, i.e. the rotary machine has to be stopped. All the data of the test u(t) and y(t) during the test time are recorded so as to be used off-line for calculating the transfer function.

The algorithms of identification of the linear systems are very numerous in the literature. In order to have a general outline of the methodologies that can be used, it may be referred, for example, to the book of I. D. Landau: "Commande des systèmes" (2002). After the rational transfer function has been obtained, the identification has to be validated, so as to ensure that the model obtained is correct. Various methods of validation exist according to the hypotheses emitted about the perturbations affecting the model (for example, test of whiteness of the prediction error). It is also recommended to validate the model through comparisons between the simulation results and the real system subjected to mono-frequency excitations (comparison about the amplitude and phase of the signals) over a frequency range corresponding to the range of interest for the rejection of perturbations.

After a transfer function corresponding to the physical system model has been obtained and validated by means of suitable tools, the matter is to synthetize the control law for the rejection of a perturbation of variable frequency f.

The characterization of the level of rejection of the mechanical perturbation, a vibration, which acts on the system, is made through the function of direct sensitivity of the looped system, denoted Syp.

Let's suppose that the control law is of the RST type, with T=0, which is the most general form of implantation of a mono-variable corrector. The looped system may then be schematized by the diagram-block of FIG. 5. In this FIG. 5, the block $q^{-d}B(q^{-1})/A(q^{-1})$ corresponds to the above-described transfer function of the physical system.

The signal p(t) is the equivalent of the vibratory perturbation that has been offset at the output of the system, without loss of generality.

The direct sensitivity function Syp can be defined as the transfer function between the signal p(t) and y(t), sensor signal. This transfer function describes the behavior of the closed loop regarding the rejection of the vibratory mechanical perturbation.

In particular, obtaining this transfer function allows knowing at any frequency the quality of perturbation rejection.

It is shown that this transfer function is written as follow:

$$S_{yp} = \frac{A(q^{-1})S(q^{-1})}{A(q^{-1})S(q^{-1}) + q^{-d}B(q^{-1})R(q^{-1})} \quad (1)$$

The object of the control law being to allow the perturbation rejection at a frequency fpert, it is required that, at said frequency, the module of Syp is low, in practice far below 0 dB.

Ideally, it would be desirable that Syp is the lowest possible at all the frequencies. Nevertheless, this objective cannot be reached due to the Bode-Freudenberg-Looze theorem, which shows that, if the closed-loop system is asymptotically stable and stable in open loop:

$$\int_0^{0.5 \cdot Fe} \log |S_{yp}(e^{-j2\pi f \cdot Fe})| df = 0$$

This equation means that the sum of the surface areas between the curve of the sensitivity module and the axis 0 dB, taken with their sign, is null. It implies that the attenuation of the perturbation in a certain zone of frequency will necessarily cause the amplification of the perturbations in other zones of frequency.

It has been seen hereinabove that the denominator of Syp is written: $A(q^{-1})S(q^{-1})+q^{-d}B(q^{-1})R(q^{-1})$. The zeros of this denominator form the poles of the closed loop.

The calculation of the coefficients of the polynomials $R(q^{-1})$ and $S(q^{-1})$ may in particular be made by a technique of pole placement. This technique is not by far the only one that can be used to synthetize a linear corrector. It is used herein. It amounts to calculate the coefficients of R and S by specifying the poles of the closed loop that are the zeros of the polynomial P, i.e.:

$$P(q^{-1})=A(q^{-1})S(q^{-1})+q^{-d}B(q^{-1})R(q^{-1}). \quad (2)$$

After these poles have been chosen, P is calculated and the equation (2), which is a Bezout equation, is solved.

The choice of the poles can be made according to various strategies. One of these strategies is proposed hereinafter.

The cancellation of the effect of the perturbations p(t) to the output is obtained at the frequencies where:

$$A(e^{-j2\pi f/Fe})S(e^{-j2\pi f/Fe})=0 \quad (3)$$

Also, to calculate a corrector rejecting a perturbation at the frequency Fpert, a part of S is specified a priori, by imposing in the equation (2) that S is factorized by Hs, polynomial of order 2, for a mono-frequency perturbation. That is to say:

$$Hs=1+h_1 \cdot q^{-1}+h_2 \cdot q^{-2} \quad (4)$$

If $$h_1 = -2\cos(2\pi \cdot fpert/Fe)$$
$$h_2 = 1$$

a pair of non-damped complex zeros is introduced at the frequency fpert.

By choosing $h_2 \neq 1$, a pair of non-zero damping complex zeros is introduced in S, such damping being chosen as a function of the attenuation desired at a certain frequency.

The Bezout equation to be solved is then:

$$S'(q^{-1}) \cdot Hs(q^{-1}) \cdot A(q^{-1}) + B(q^{-1})R(q^{-1}) = P(q^{-1}) \quad (5)$$

However, the vibration frequency to be rejected is generally variable, as a function in particular of the speed of rotation of the motor shaft. It results therefrom that the block Hs would also vary as a function of the frequency of the vibratory perturbation. As a consequence, a Bezout equation of the form (5) should also be solved and that for each frequency to be rejected.

It can be seen that this would generate a high volume of calculations if the solving of this equation were to be implemented in real time. Besides, all the coefficients S and R of the corrector would be bound to vary upon a change of frequency. This leads to a very heavy algorithm, which is not industrially feasible.

In order to solve this problem, it will be proposed in the following a solution based on the concept of parameterization of Youla-Kucera.

Figure 6:
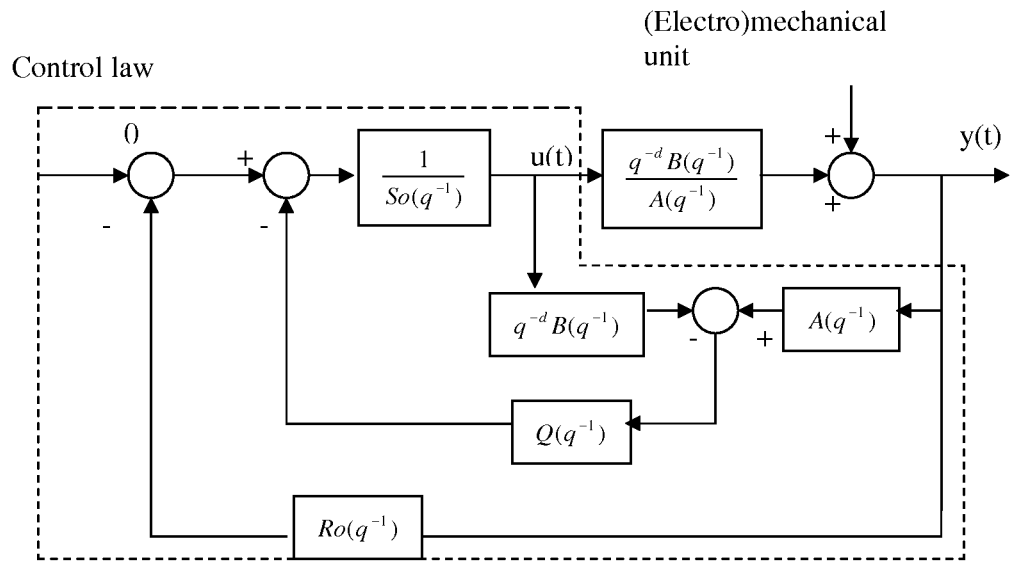

A mono-variable system piloted by a corrector of RS type to which has been added the Youla parameter is in the form shown in FIG. 6.

Such a corrector is based on a RS corrector referred to as central, consisted of the blocks $Ro(q^{-1})$ and $So(q^{-1})$. The Youla parameter is the block $$Q(q^{-1}) = \frac{\beta(q^{-1})}{\alpha(q^{-1})},$$

$\alpha$, $\beta$ being polynomials in $q^{-1}$. The blocks $q^{-d}B(q^{-1})$ and $A(q^{-1})$ are the numerator and denominator of the transfer function of the system to be controlled, and the way to determine and calculate the parameters of the transfer function of which by stimulation and identification has been seen.

The whole corrector that has been obtained is equivalent to a corrector of the (R,S) type, whose blocks R and S are equal to:

$$R(q^{-1}) = Ro(q^{-1}) \cdot \alpha(q^{-1}) + A(q^{-1}) \cdot \beta(q^{-1})$$

$$S(q^{-1}) = So(q^{-1}) \cdot \alpha(q^{-1}) - q^{-d}B(q^{-1}) \cdot \beta(q^{-1}) \quad (6)$$

Let's suppose that a central corrector has been constituted and that it stabilizes the system.

Without Youla parameterization, the characteristic polynomial Po of the system, as seen hereinabove, is written:

$$Po(q^{-1}) = A(q^{-1}) \cdot So(q^{-1}) + q^{-d}B(q^{-1}) \cdot Ro(q^{-1}) \quad (7)$$

By providing the corrector with the Youla parameter, the characteristic polynomial of the system is written:

$$P(q^{-1}) = A(q^{-1}) \cdot (So(q^{-1}) \cdot \alpha(q^{-1}) - q^{-d}B(q^{-1}) \cdot \beta(q^{-1})) + q^{-d}B(q^{-1}) \cdot (Ro(q^{-1}) \cdot \alpha(q^{-1}) + A(q^{-1}) \cdot \beta(q^{-1})) = Po(q^{-1})\alpha(q^{-1})P(q^{-1}) = Po(q^{-1}) \cdot \alpha(q^{-1})$$

It is therefore seen that the poles of Q (zeros of a) are added to the poles of the loop equipped only with the central corrector whose characteristic polynomial is Po.

Besides, the following equation can be used:

$$S(q^{-1}) = So(q^{-1}) \cdot \alpha(q^{-1}) - q^{-d}B(q^{-1})\beta(q^{-1}) \quad (8)$$

to specify the block S with a pre-specification block Hs, i.e.:

$$S'(q^{-1}) \cdot Hs(q^{-1}) = So(q^{-1}) \cdot \alpha(q^{-1}) - q^{-d}B(q^{-1})\beta(q^{-1})$$

Let's consider:

$$S'(q^{-1}) \cdot Hs(q^{-1}) + q^{-d}B(q^{-1})\beta(q^{-1}) = So(q^{-1}) \cdot \alpha(q^{-1}) \quad (9)$$

that is also a Bezout equation, allowing in particular $\beta$ to be found if $\alpha$ and Hs are defined.

It can be noted that the Youla parameterization has still be used for the purpose of sinusoidal perturbation rejection: it is about the control of vibrations of an active suspension. The corresponding article is: "Adaptive narrow disturbance applied to an active suspension—an internal model approach" (Automatica 2005), whose authors are I. D Landau, et al. In the latter device, the Youla parameter is in the form of a finite impulse response filter (transfer function with a single numerator), whereas, in the present invention, it will be seen that this Youla parameter is in the form of an infinite impulse response filter (transfer function with a numerator and a denominator). Moreover, in this article, the calculation of the coefficients of the Youla parameter is made by means of an adaptive device, i.e. the information about the perturbation frequency is not known, unlike the present invention where this frequency is known based on measures, for example from a revolution counter, and where the coefficients of the Youla parameter are stored in tables for being used in real time. The devices and method used in the invention provide a far higher robustness of the control law.

In the case of the invention, it corresponds to an insensitivity of the control law to the parametric variations of the system model, which, from an industrial point of view, is a major element.

Coming back to the proposed corrector, let's Sypo be the function of direct sensitivity of the looped system with the central corrector. The function of direct sensitivity of the looped system with a corrector provided with the Youla parameter is written:

$$S_{yp} = S_{ypo} - \frac{q^{-d}B(q^{-1})}{P(q^{-1})} Q(q^{-1}) \quad (10)$$

Therefore, from a looped system comprising a central corrector having not the vocation to reject a sinusoidal perturbation at a frequency fpert in particular, it may be added to the central corrector the Youla parameter that will modify the sensitivity function Syp, while maintaining the poles of the closed loop provided with the central corrector, to which will be added the poles of Q.

A notch can then be created in Syp at the frequency fpert.

For that purpose, Hs and $\alpha$ are calculated in such a way that the transfer function $$\frac{Hs(q^{-1})}{\alpha(q^{-1})}$$

results from the discretization (Tustin method with "pre-warping") of a continuous block of the second order:

$$\frac{\dfrac{s^2}{(2\pi \cdot fpert)^2} + \dfrac{\varsigma_1 \cdot s}{(2\pi \cdot fpert)} + 1}{\dfrac{s^2}{(2\pi \cdot fpert)^2} + \dfrac{\varsigma_2 \cdot s}{(2\pi \cdot fpert)} + 1}$$

It is shown that the attenuation M at the frequency fpert is given by the relation:

$$M = 20\log\left(\frac{\varsigma_1}{\varsigma_2}\right) avec\ \varsigma_1 < \varsigma_2 \quad (11)$$

Besides, for an equal ratio of $$\frac{\zeta_1}{\zeta_2},$$

it is shown that the more $\zeta_2$ is high, the more C2 the notch on the sensitivity function Syp is wide. But the more this notch is wide, the more |Syp| is deformed at the other frequencies than fpert. Therefore, a compromise has to be found so as to create a wide enough attenuation around fpert without causing a too high rise of |Syp| at the other frequencies.

$\beta$ can then be calculated by solving the Bezout equation (9).

It is shown that this choice of Hs and $\alpha$ creates a notch in the sensitivity function Syp, while having an almost negligible effect at the other frequencies with respect to Sypo, even if, of course, the Bode-Freudenberg-Looze theorem applies, which inevitably causes a rise of the Syp module with respect to Sypo at other frequencies than fpert.

This rise of the sensitivity function may decrease the robustness of the closed loop, measurable by the module margin (distance to the point −1 of the location of the corrected open loop in the Nyquist plane) equal to the reverse of the maximum of |Syp| over the frequency range [0; Fe/2].

The main advantage of using the Youla parameter is that α is of order 2:

$$\alpha(q^{-1}) = 1 + \alpha_1 \cdot q^{-1} + \alpha_2 \cdot q^{-2} \quad (12)$$

moreover, β is of order 1 $\beta(q^{-1}) = \beta_1 \cdot q^{-1} + \beta_2 \cdot q^{-2}$ (13)

Hence, the number of parameter varying as a function of the frequency in the control law is only of 4. The calculation of these parameters as a function of the vibratory frequency to be rejected may be performed off-line (solving the Bezout equation (9)), during the preliminary phase of design of the control law, wherein the parameters can be memorized in tables of the calculator and invoked, during the operation in real time, as a function of the frequency of the vibratory perturbation and thus of the speed of rotation of the rotary machine that can be obtained from a revolution counter.

Figure 7:
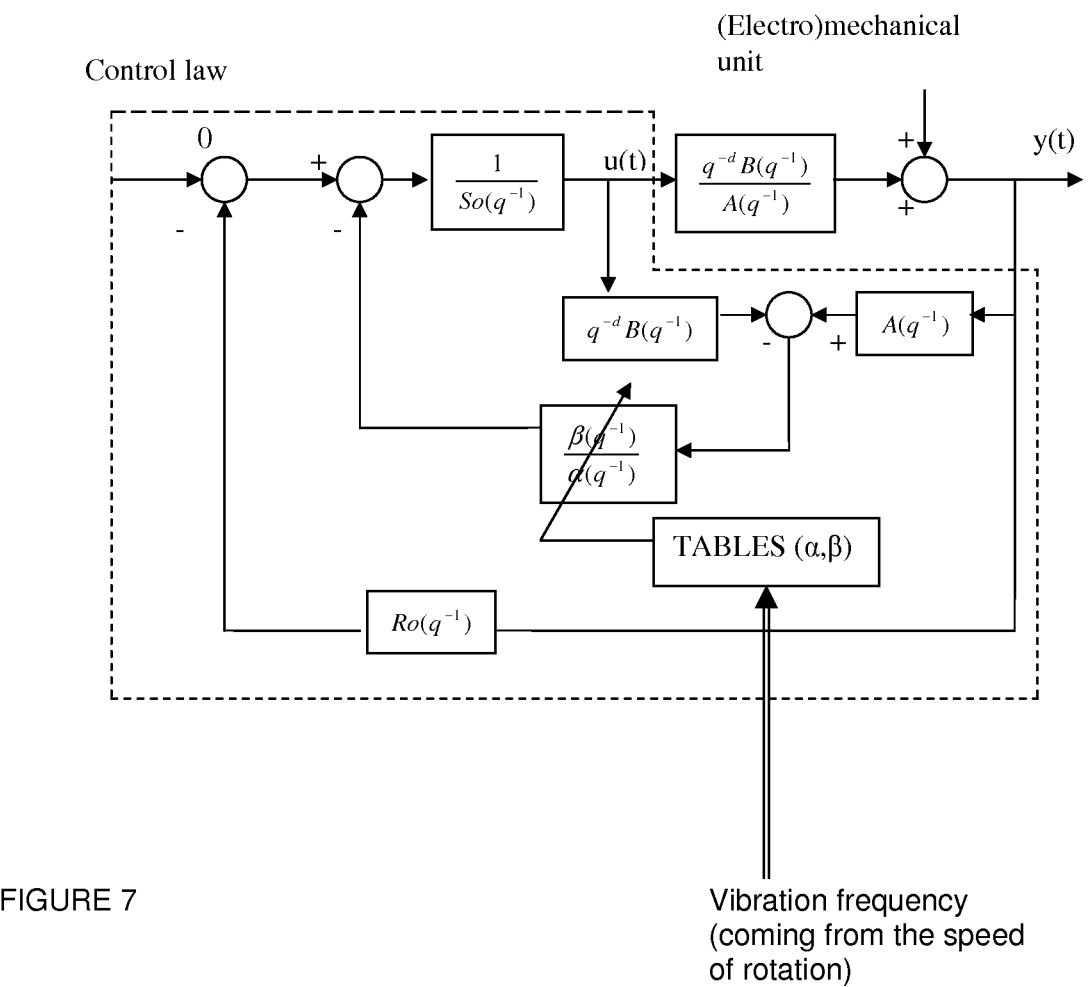

FIG. 7 gives the complete scheme of the control law obtained.

A methodology for the control law synthesis will now be explained.

The central corrector is synthesized in such way that it ensures gain margins of at least 10 dB and a high enough phase margin.

This may be obtained, for example, by a technique of pole placement. Various methodologies have been developed by searchers such as Philippe de Larminat in "Automatique appliquée", 2$^{nd}$ edition, Hermes 2009, or Loan Doré Landau in "Commande des systèmes", Hermes 2002.

The placement of the poles of the closed loop is made by placing n dominant poles using, for example, the "ppa" strategy described in the above-mentioned book of Philippe de Larminat.

A certain number of auxiliary poles are also placed in "high frequency". These auxiliary poles have for role to increase the robustness of the control law. This may be performed by the "ppb" strategy described in the above-mentioned book of Philippe de Larminat.

After having thus chosen the poles of the closed loop, Po(q$^{-1}$) is expressed and the following equation, of unknown quantities So and R'o, is solved:

$$So(q^{-1}) \cdot A(q^{-1}) + q^{-d} B(q^{-1}) \cdot Hr(q^{-1}) \cdot R'o(q^{-1}) = Po(q^{-1}) \quad (14)$$

In the equation (14), Hr is a polynomial of pre-specification of the polynomial Ro:

$R_o = Hr \cdot R'_o$, with $Hr = (1+q^{-1}) \cdot (1-q^{-1})$ so as to open the control loop at the frequency 0 and at the frequency Fe/2.

The central corrector has thus been obtained.

The poles of the Youla parameter Q are then calculated.

For each of the speeds of rotation fpert of the perturbation to be rejected, the $\zeta_1$, $\zeta_2$ of equation (11) are chosen so as to adjust the depth of attenuation of Syp at said frequency, as well as the width of the notch at the frequency fpert in Syp.

Hs and α are calculated as explained hereinabove by discretization of a second order cell and the Bezout equation (9) is solved, so as to determine β.

This calculation ending up in the determination of α and β as a function of fpert is performed over the whole range of frequency of the vibratory perturbation that might be met and that is to be rejected. α and β can for example be calculated for vibratory perturbation frequencies varying by 2 Hz steps when the sampling period is of the order of 500 Hz. It is understood that the choice of the speed pitch, fixed or different according to the position in the range considered, can be optimized as a function of the width of attenuation.

The set of coefficients of α and β as a function of fpert is then memorized in a table of the calculator.

When the calculator works in real time, these coefficients are invoked as a function of the information about the speed of rotation of the rotary machine, the frequency of the current vibratory perturbation ensuing from the value of the current speed of rotation. For that purpose, a tachometric measurement of the axis of the rotary machine may be performed. For values of fpert that do not correspond directly to the frequencies input in the table (fpert between two values of the table), an estimation of the coefficients α and β may be performed through an interpolation between two known values, provided that the pitch of the frequency mesh is not too large.

The control law being synthesized, it is possible to verify the stability and the level of robustness (module margin >0.5) in simulation of the thus determined and calculated looped system with attempt to reject perturbations over the whole range of frequency considered. If the results of the rejection are not acceptable, the design of the control law is modified by acting on the coefficients $\zeta_1$, $\zeta_2$ (frequency depth and width of the rejection).

It has been considered in what precedes a system provided with a single sensor and either with one actuator, or with a group of actuators excited by the same control signal. Such a configuration would correspond to a system referred to as mono-variable.

In practice, the rotary machines are supported by several fixation supports. It is then desirable to reduce the intensity of the vibrations of each of the fixation supports and to place as many sensors as there are fixation supports and to specifically control each of the actuators or groups of actuators of each fixation support.

Therefore, hereinafter, the problem will be considered, in which the system is equipped with several sensors and several actuators (or several groups of actuators controlled by a same control signal).

A first solution would be to use the control scheme previously established for the mono-variable case and to make one by one actuator-sensor loops. This solution might provide a very bad result, or even instability. Indeed, an actuator will have an influence on all the sensors.

From the automatic control engineer point of view, it is a multi-variable problem (several inputs and several outputs coupled to each other).

Figure 8:
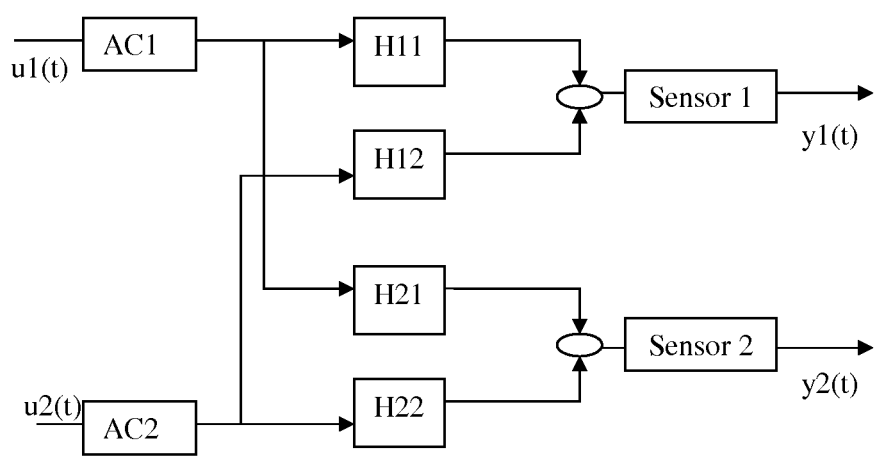

Such multi-variables systems may be schematized and modeled and, by way of example, a diagram of the transfer on a 2*2 system (2 actuators, 2 sensors) is shown in FIG. 8.

In this example of FIG. 8, the sensor 1 is sensitive to the mechanical effects of the actuator 1 (AC1) and of the actuator 2 (AC2).

This system given by way of example can be modeled by the following matrix of transfer functions:

$$\begin{bmatrix} y1(t) \\ y2(t) \end{bmatrix} = \begin{bmatrix} H11 & H12 \\ H21 & H22 \end{bmatrix} \cdot \begin{bmatrix} u1(t) \\ u2(t) \end{bmatrix} \quad (15)$$

Or else, still in the (2*2) case:

$$\begin{bmatrix} y1(t) \\ y2(t) \end{bmatrix} = \begin{bmatrix} \frac{B11(q^{-1})}{A11(q^{-1})} & \frac{B12(q^{-1})}{A12(q^{-1})} \\ \frac{B21(q^{-1})}{A21(q^{-1})} & \frac{B22(q^{-1})}{A22(q^{-1})} \end{bmatrix} \cdot \begin{bmatrix} u1(t) \\ u2(t) \end{bmatrix} \quad (16)$$

The representation of a multi-variable system by a transfer function is actually not very practical, so the state representation, which is a universal representation of linear systems (multi-variable or not), is preferred.

Let's consider:

nu: the number of inputs of the system (i.e. the number of actuators or groups of actuators connected to each other)

ny: the number of outputs of the system (i.e. the number of sensors)

n: the order of the system.

Hereinafter, it will be considered that nu=ny, while it is not restrictive, because all the following may apply to the case nu>ny.

The state representation of the system is written:

$$X(t+Te)=G \cdot X(t)+H \cdot U(t)$$

$$Y(t)=W \cdot X(t) \quad (17)$$

X: state vector of the system of size (n*1)
U: vector of the system inputs of size (nu*1)
Y: vector of the outputs of size (ny*1)
X(t): vector X at the time instant t
X(t+Te): vector X at the time instant t+Te (i.e. an offset by a sampling period Te).
With:
G: transition matrix of size (n*n)
H: input matrix of the system of size (n*nu)
W: output matrix of the system of size (ny*n).

The coefficients of the matrices G, H, W define the multi-variable linear system.

Figure 9:
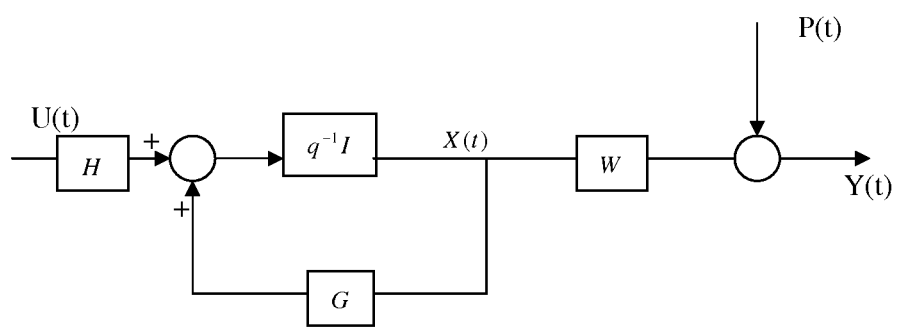

The control law is based on this state representation, so it is necessary to have a model of the physical system (rotary machine, fixation support, actuators, sensors, mounted on the physical structure) to be controlled, i.e. the coefficients of the matrices G, H, W. A block diagram of the model of the physical system to be controlled is shown in FIG. 9.

These coefficients are obtained by a procedure of identification, i.e. by stimulation of the physical system with vibrations having a spectrum of the white noise type or close to it, the nu actuators being excited by signals decorrelated with respect to each other.

The data obtained at the level of the sensors are memorized and used in order to obtain a state representation of the system, using identification algorithms dedicated to the multi-variable systems. These algorithms are, for example, provided in software toolboxes specialized for the field of automatic control engineering, as well as means for the validation of the model.

Let's suppose that an input-output model of the system has now been obtained in the form of a state representation ant that this model has been validated. A control law has now to be synthesized, which allows rejecting at each of the sensors a vibratory perturbation of frequency fpert.

For that purpose, the concept of central corrector and the concept of Youla parameterization will be generalized to the multi-variable case in a state form.

Let's consider the system described by the state representation (17).

The central corrector is in a form: state observer+estimated state feedback, which may be expressed by:

$$\hat{X}(t+Te)=G \cdot \hat{X}(t)+H \cdot U(t)+Kf \cdot (Y(t)-W \cdot \hat{X}(t)) \quad (18)$$

where:
$\hat{X}$ is the state vector of the observer of size (n*1)
$Kf$ is the gain of the observer of size (n*ny)
Thus:

$$\hat{X}(t+Te)=(G-Kf \cdot W) \cdot \hat{X}(t+Te)+H \cdot U(k)+Kf \cdot (Y(t+Te)) \quad (19)$$

and the control is written:

$$U(t)=Kc \cdot \hat{X}(t) \quad (20)$$

Kc being the vector of the estimated state feedback of size (nu*n).

Figure 10:
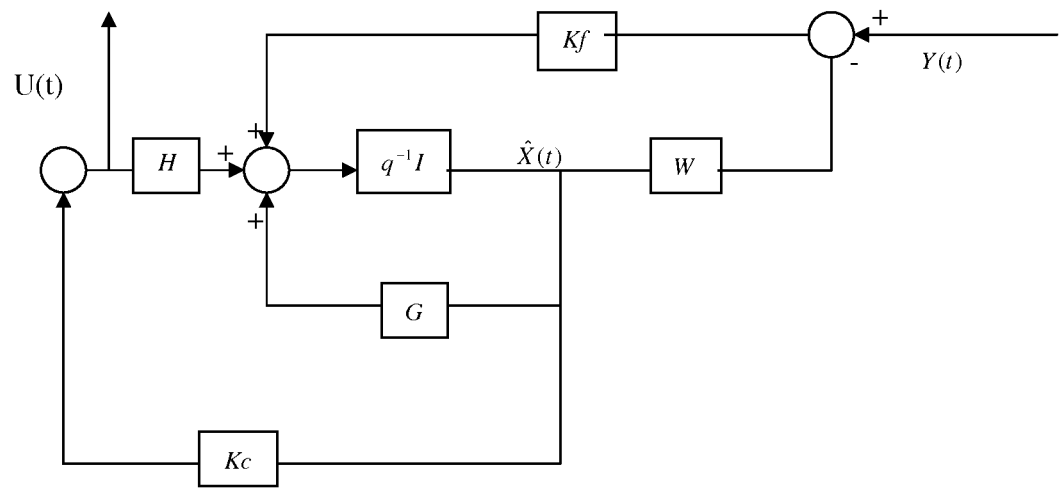

The block-diagram representation of the central corrector (observer and state feedback) is shown in FIG. 10.

By analogy with the mono-variable case, P is the vector of the perturbations on the outputs:

$$P(t) = \begin{pmatrix} p_1(t) \\ \vdots \\ p_{ny}(t) \end{pmatrix}$$

pi being the perturbation on the output i.

Figure 11:
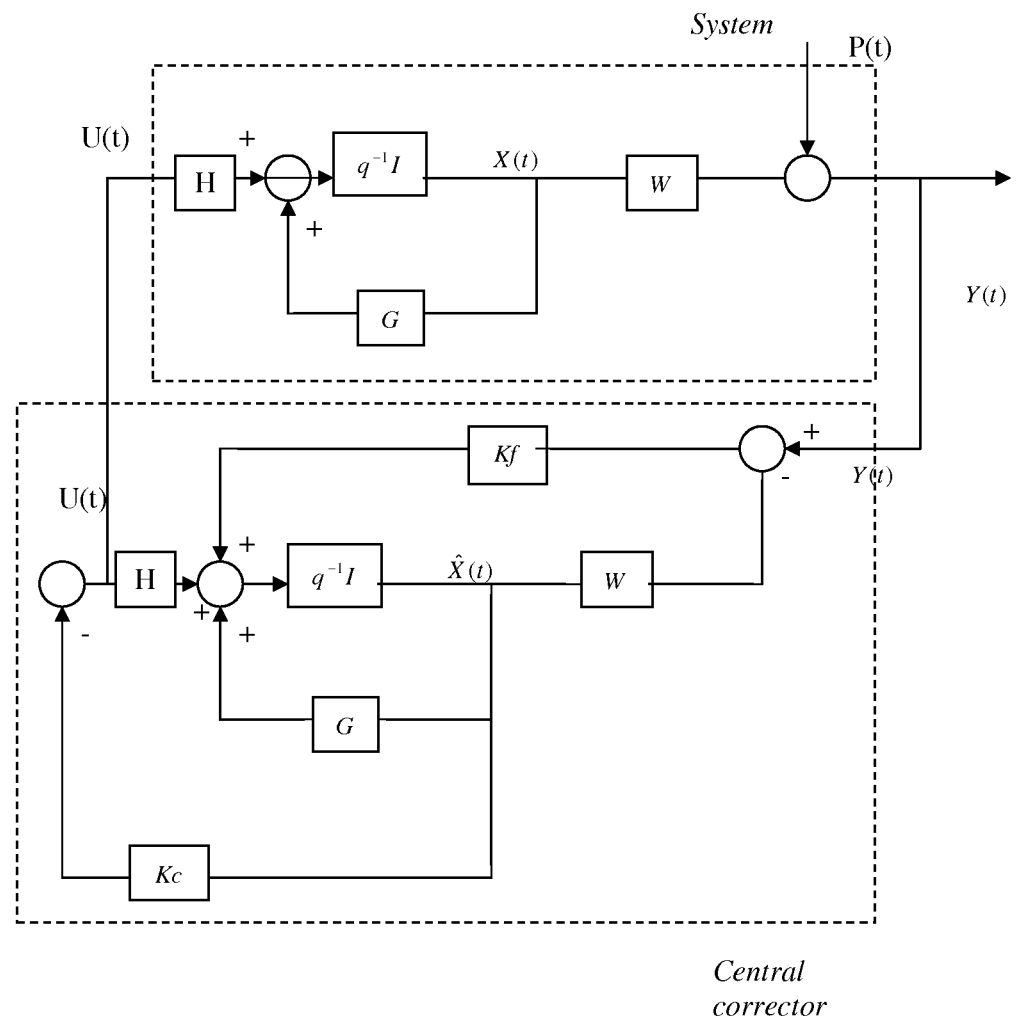

The block-diagram representation of the system provided with the central corrector is shown in FIG. 11.

Such a correction structure is conventional in automatic control engineering. In accordance with a principle named the "principle of separation", the poles of the closed loop are consisted of the eigen values of G−Kf·W and of the eigen values of G−H·Kc:

$$\mathrm{eig}(G-Kf \cdot W) \cup \mathrm{eig}(G-H \cdot Kc).$$

eig(G−Kf·W) are called the filtering poles and
eig(G−H·Kc) are called the control poles.

Therefore, the placement of the poles of the closed loop provided with the central corrector may be made by choosing the coefficient of Kf and Kc that are the adjustment parameters of this correction structure. The number of poles to be placed is 2*n.

This observer-and-estimated-state-feedback structure is therefore chosen as the central corrector.

In the multi-variable case, Kf is calculated by a strategy based for example on a quadratic optimization, referred to as LQ, for example the strategy "Iqa" of Philippe de Larminat developed in the above-mentioned book.

Therefore, the equation of the central corrector (recurrence calculation) becomes:

$$\hat{X}(t+Te)=(G-Kf \cdot W) \cdot \hat{X}(t)+H \cdot U(t)+Kf \cdot Y(t) \quad (22)$$

It remains n poles to be placed (the control poles eig(G−H·Kc)). By following what have been made for the mono-variable corrector, these poles will be chosen as a set of high frequency poles intended to ensure the robustness of the control law. In order to calculate Kc, it is also possible to use a quadratic optimization, referred to as LQ, for example the strategy "Iqb" developed by Philippe de Larminat in the above-mentioned book.

The central corrector being adjusted, it remains to see how the Youla parameter becomes integrated in the control law, the objective being still to reject sinusoidal perturbations of known frequency fpert at the level of each sensor, by doing so that only the coefficients of the Youla parameter vary when fpert vary.

Figure 12:
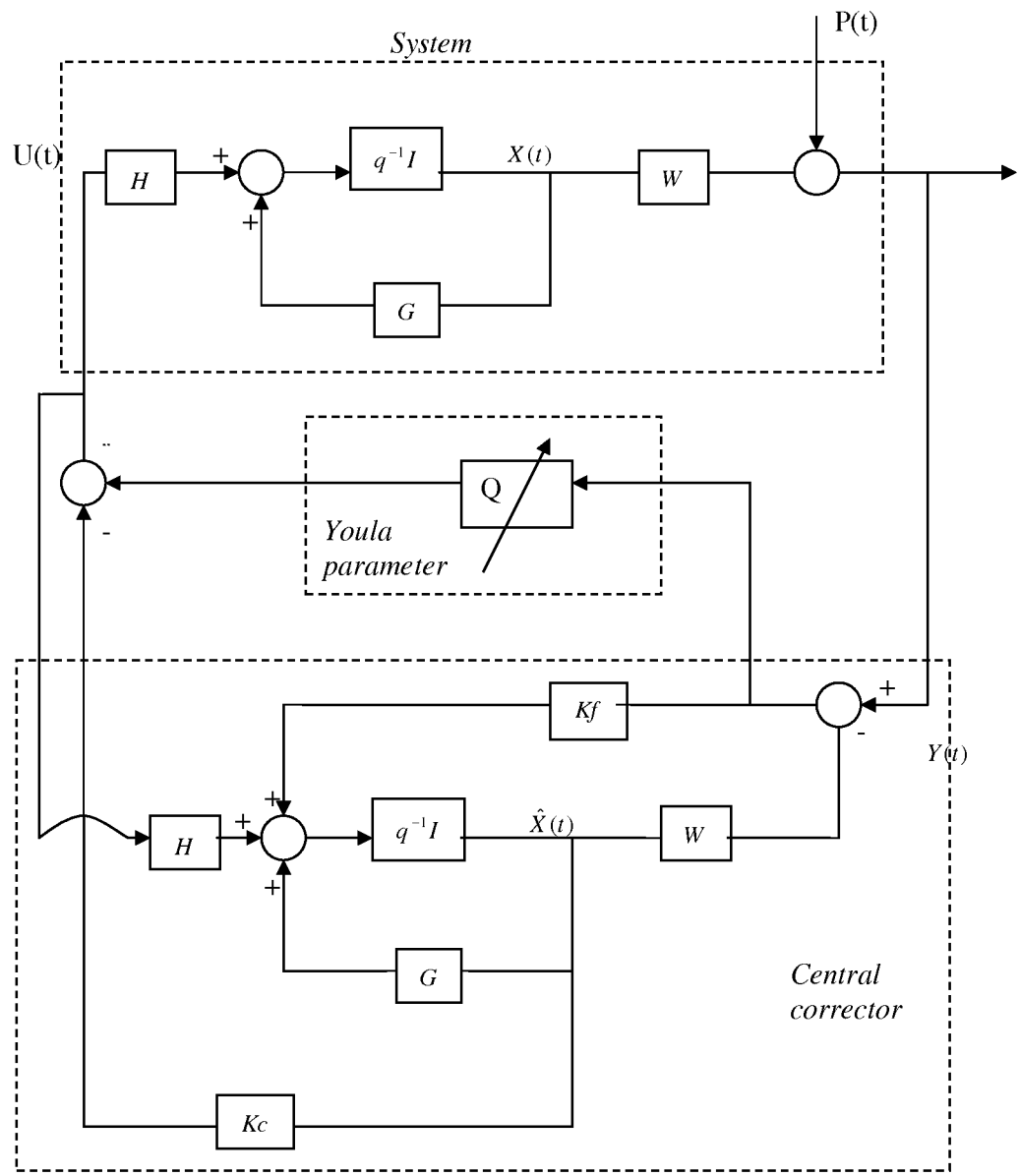

It is shown that the Youla parameter becomes incorporated in the control law as presented in the diagram of FIG. 12 (it may for example be referred to the following article: "From Youla-Kucera to identification, adaptive and nonlinear control", of Brian D. O. Anderson, Automatica, 1998).

The Youla parameter, Q, is itself a multi-variable block whose state representation may be written:

$$X_Q(t+Te) = A_Q X(t) + B_Q(Y(t) - W \cdot \hat{X}(t)) \tag{23}$$

The control law then being written:

$$U(t) = K_c \cdot X(t) - C_Q \cdot X_Q(t) \tag{24}$$

The way to determine and calculate the parameters of Q in order to ensure a rejection of vibratory perturbations of known frequency will now be shown. Indeed, within the multi-variable framework, the Youla parameter may also be expressed in a state form:

$$X_Q(t+Te) = A_Q \cdot X_Q(t) + B_Q \cdot (Y(t) - W \cdot \hat{X}(t)) \tag{25}$$

Here, $X_Q(t)$ is the state vector of the Youla parameter at the time instant t.

Moreover, it is known that the fundamental property of the Youla parameterization is that the poles of the closed loop are kept by the adding of the Youla parameter, poles to which are added the poles of the Youla parameter.

This means that the poles of the closed loop will be:

$$\text{eig}(G - Kf \cdot W) \cup \text{eig}(G - H \cdot Kc) \cup \text{eig}(A_Q).$$

It may be searched to express $A_Q$ in such a manner that it is diagonal by blocks, for example of the form:

$$A_Q = \begin{bmatrix} -\alpha 1 & 1 & 0 & 0 & 0 \\ -\alpha 2 & 0 & 0 & 0 & 0 \\ 0 & 0 & -\alpha 1 & 1 & 0 \\ 0 & 0 & -\alpha 2 & 0 & 0 \\ 0 & 0 & 0 & 0 & \ddots \end{bmatrix} \tag{26}$$

i.e. $A_Q$ is consisted of ny blocks $$A_{QI} = \begin{bmatrix} -\alpha 1 & 1 \\ -\alpha 2 & 0 \end{bmatrix}$$

placed in diagonal.

It is then clear that the eigen values of $A_Q$ are the roots of the polynomial $\alpha(q^{-1}) = 1 + \alpha_1 \cdot q^{-1} + \alpha_2 \cdot q^{-2}$ with a multiplicity equal to ny.

It may be chosen:

$$C_Q = \begin{bmatrix} 1 & 0 & 0 & 0 & 0 \\ 0 & 0 & 1 & 0 & 0 \\ 0 & 0 & 0 & 0 & \ddots \end{bmatrix} \tag{27}$$

i.e. $C_Q$ is consisted of ny blocks $C_{Q1} = [1\ 0]$ placed in diagonal.

And finally, the matrix $B_Q$ is of size 2*ny*ny.

It thus remains to determine the coefficient of $B_Q$.

Based on the above-mentioned publication "From Youla-Kucera to identification, adaptive and nonlinear control", and considering:

$$Q(z) = C_Q(z \cdot I - A_Q)^{-1} B_Q \tag{28}$$

I, the unit matrix and z, the variable of the Z-transform, $$XX(z) = K_c \cdot (zI - G + H \cdot Kc)^{-1} \cdot Kf$$

$$YY(z) = W \cdot (zI - G + H \cdot Kc)^{-1} \cdot Kf$$

$$NN(z) = W \cdot (zI - G + H \cdot Kc)^{-1} \cdot H$$

$$DD(z) = -Kc \cdot (zI - G + H \cdot Kc)^{-1} \cdot H \tag{29}$$

The following relation is verified:

$$U(t) = -[XX(z) + DD(z) \cdot Q(z)] \cdot [YY(z) - NN(z) \cdot Q(z)]^{-1} \cdot Y(t) \tag{30}$$

According to the internal model principle of Wonham (see for example "The internal model principle for linear multivariate regulators" of B. A Francis and W. M. Wonham in Applied mathematics and optimization, volume 2, no 2), it appears that the theoretically perfect rejection of a perturbation will be obtained at the frequency fpert if, at this frequency, the gain of open loop is infinite, i.e., due to the fact that $z = e^{j \cdot 2 \pi \cdot fpert \cdot Te}$:

$$YY(e^{j \cdot 2 \pi \cdot fpert \cdot Te}) - NN(e^{j \cdot 2 \pi \cdot fpert \cdot Te}) \cdot Q(e^{j \cdot 2 \pi \cdot fpert \cdot Te})$$
$$= 0_{nu*ny} \tag{31}$$

But Q(z) can be decomposed into two parts:

$$Q(z) = Q_1(z) \cdot B_Q \tag{32}$$

This affine character of the coefficients of $B_Q$ in the equation (32) also allows an easy solving. For that purpose, it is just required to express the following equations by performing a separation between the real and imaginary parts of the equation (31):

$$Re(YY(e^{j \cdot 2 \pi \cdot fpert \cdot Te})) - Re(NN(e^{j \cdot 2 \pi \cdot fpert \cdot Te}) \cdot Q_1(e^{j \cdot 2 \pi \cdot fpert \cdot Te})) \cdot B_Q = 0_{nu*ny}$$

$$Im(YY(e^{j \cdot 2 \pi \cdot fpert \cdot Te})) - Im(NN(e^{j \cdot 2 \pi \cdot fpert \cdot Te}) \cdot Q_1(e^{j \cdot 2 \pi \cdot fpert \cdot Te})) \cdot B_Q = 0_{nu*ny} \tag{33}$$

The matter is then the solving of a linear system whose number of equations is 2*ny, which is exactly the number of coefficients of $B_Q$. The solving of this linear system is then easy and allows obtaining the values of the Youla parameter block coefficients that give a theoretically perfect rejection.

However, it is preferable that, in some cases, the perturbation rejection is not theoretically perfect. The coefficients of $B_Q$ may then be calculated, for example, by solving the system of equations:

$$Re(YY(z_1)) - Re(NN(z_1) \cdot Q_1(z_1)) \cdot B_Q = 0_{nu*ny}$$

$$Im(YY(z_1)) - Im(NN(z_1) \cdot Q_1(z_1)) \cdot B_Q = 0_{nu*ny} \tag{34}$$

where $z_1$ is one among two roots of the polynomial $\beta(z) = z^2 + \delta_1 \cdot z + \delta_2$, the coefficients $\delta_1$, $\delta_2$ as well as $\alpha_1$, $\alpha_2$ may be determined based on the transfer function $$\frac{1 + \delta_1 \cdot q^{-1} + \delta_2 \cdot q^{-2}}{1 + \alpha_1 \cdot q^{-1} + \alpha_2 \cdot q^{-2}}$$

resulting from the discretization of one cell of the second order similar to that used un the mono-variable case:

$$\frac{\dfrac{s^2}{(2\pi \cdot fpert)^2} + \dfrac{\varsigma_1 \cdot s}{(2\pi \cdot fpert)} + 1}{\dfrac{s^2}{(2\pi \cdot fpert)^2} + \dfrac{\varsigma_2 \cdot s}{(2\pi \cdot fpert)} + 1} \tag{35}$$

As in the mono-variable case, $\zeta_1$ determines the depth of the rejection notches in Syp, and once this value fixed, the choice of $\zeta_2$ allows adjusting the width of said notches.

Therefore, in a preliminary step, the coefficients of $A_Q$, $B_Q$, $C_Q$ may be calculated during the adjustment of the control law, for each perturbation frequency, and placed in tables, in order to be invoked as a function of fpert on the real time calculator for a real time rejection of the vibratory perturbation.

Figure 13:
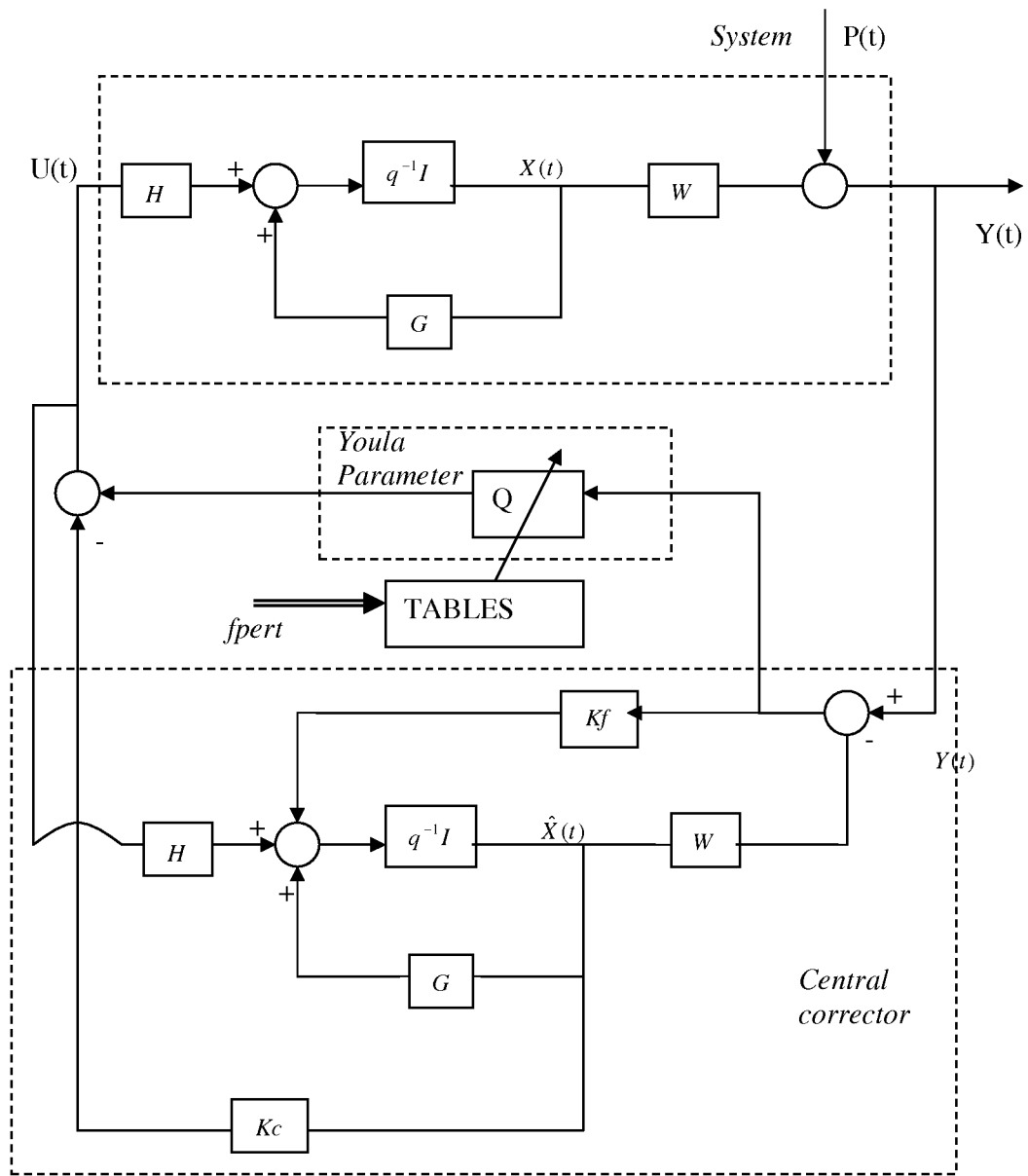

The structure of the control law to be implemented for the real time rejection of the vibratory perturbation is shown in FIG. 13.

The adjustment parameters of the control law reside in the choice of the poles of the closed system by the central corrector alone (by the parameters of Kc and Kf that have an influence on the robustness of the control law). For each frequency, the $\zeta_1$, $\zeta_2$ of the continuous cells of second order can be chosen, influencing the frequency widths and depth of the perturbation rejections at the frequency fpert.

These adjustment possibilities generalize the adjustment possibilities of the mono-variable case.

To sum up, the multi-variable control law is obtained by performing the following operations during a preliminary step:

obtaining a multi-variable linear model in the form of a state representation, by stimulation and identification;

synthesizing a central corrector in the form of a state observer and an estimated state feedback; the gains Kc and Kf being for example calculated by quadratic optimization;

choosing $\zeta_1$, $\zeta_2$ for a mesh of perturbation frequencies to be rejected;

calculating the coefficients of the Youla parameter that are placed in tables of the real-time calculator.

Thereafter, the thus obtained and calculated multi-variable control law may be implemented in real time in a calculator to control effectors, the real time calculations being performed as a function of the vibratory perturbation frequency, the latter being obtained directly or indirectly from the speed of rotation of the rotary machine.

It is understood that the invention also relates to a calculator or physical programming means specially configured for the execution of the method of attenuation of mechanical vibratory perturbations.

In the explanations that have been given up to now, it has been considered the rejection of one frequency at a time for reasons of simplification. However, the invention allows the rejection of several vibratory perturbation frequencies at a time, each of which being essentially mono-frequency, thus of narrowband. Therefore, whether in the mono-variable case or in the multi-variable case, it is possible to reject simultaneously more than one frequency. This leads to introduce a second or even a third notch in the sensitivity function Syp. However, it should not be lost sight that, taken into account Bode-Freudenberg-Looze theorem, the making of one or several additional notches in the sensitivity function necessarily causes a rise of |Syp| at the other frequencies, hence a reduction of the robustness.

In the following, it will be supposed that two frequencies are rejected, but this is not limitative and is given only by way of example. These two frequencies are:

the current frequency fpert (reusing the hereinabove notations), a second frequency proportional to fpert, which will be noted $\eta \cdot$fpert, $\eta$ being constant but not necessarily an integer.

In the mono-variable case, the Bezout equation (9) is still true:

$$S'(q^{-1}) \cdot Hs(q^{-1}) + q^{-d} B(q^{-1}) \beta(q^{-1}) = So(q^{-1}) \cdot \alpha(q^{-1})$$

whose unknowns are still $S'(q^{-1})$ and $\beta(q^{-1})$, but this time Hs and $\alpha$ are such that the transfer function $$\frac{Hs(q^{-1})}{\alpha(q^{-1})}$$

results from the discretization of a continuous block by the Tustin method consisted of a product of two continuous cells of the second order:

$$\frac{\frac{s^2}{(2\pi \cdot fpert)^2} + \frac{2 \cdot \varsigma_{11} \cdot s}{(2\pi \cdot fpert)} + 1}{\frac{s^2}{(2\pi \cdot fpert)^2} + \frac{2 \cdot \varsigma_{21} \cdot s}{(2\pi \cdot fpert)} + 1} \cdot \frac{\frac{s^2}{(2\pi \cdot \eta \cdot fpert)^2} + \frac{2 \cdot \varsigma_{12} \cdot s}{(2\pi \cdot \eta \cdot fpert)} + 1}{\frac{s^2}{(2\pi \cdot \eta \cdot fpert)^2} + \frac{2 \cdot \varsigma_{22} \cdot s}{(2\pi \cdot \eta \cdot fpert)} + 1}$$

Hs and $\alpha$ are here polynomials in $q^{-1}$ of degree 4 and $\zeta_{11}$ $\zeta_{12}$ $\zeta_{21}$ $\zeta_{22}$ are damping factors allowing, as in the case of the mono-frequency rejection, adjusting the width and depth of the attenuation notch in the curve representative of the module of Syp.

Herein, $\alpha(q^{-1})$ is a polynomial of order 4 and $\beta(q^{-1})$ is a polynomial of order 3. The number of variable coefficients in the control law is thus higher: there are 4 additional coefficients to be varied as a function of fpert. The solving of such a system is operated in a manner equivalent to what has been presented in the case of only one frequency.

In the multi-variable case, it may be searched to express $A_Q$ in such a manner that it is diagonal by blocks, for example of the form:

$$A_Q = \begin{bmatrix} A_{QI} & 0_{4,4} & 0_{4,4} \\ 0_{4,4} & A_{QI} & 0_{4,4} \\ 0_{4,4} & 0_{4,4} & \ddots \end{bmatrix}$$

i.e. $A_Q$ is consisted of ny blocks $$A_Q = \begin{bmatrix} -\alpha_1 & 1 & 0 & 0 \\ -\alpha_2 & 0 & 0 & 0 \\ 0 & 0 & -\alpha_3 & 1 \\ 0 & 0 & -\alpha_4 & 0 \end{bmatrix}$$

placed in diagonal.

It is then clear that the eigen values of $A_Q$ are the roots of the polynomials $\alpha(q^{-1}) = (1 + \alpha_1 \cdot q^{-1} + \alpha_2 \cdot q^{-2}) \cdot (1 + \alpha_3 \cdot q^{-1} + \alpha_4 \cdot q^{-2})$ with a multiplicity equal to ny.

It may be chosen:

$$C_Q = \begin{bmatrix} C_{QI} & 0_{1,4} & 0_{1,4} \\ 0_{1,4} & C_{QI} & 0_{1,4} \\ 0_{1,4} & 0_{1,4} & \ddots \end{bmatrix}$$

i.e. $C_Q$ is consisted of ny blocks $C_{QI} = [1\ 0\ 1\ 0]$ placed in diagonal.

And finally, the matrix $B_Q$ is of size 4*ny*ny.

It thus remains to determine the coefficients of $B_Q$.

Now:

$$Q(z) = C_Q(z \cdot I - A_Q)^{-1} B_Q \qquad 5$$

The unknowns of the problem are now the 4*ny*ny coefficients of $B_Q$ that are determined by means of the previously seen equations 31 to 35.

What has just been described for a number of simultaneously rejected frequencies equal to 2 may be extended to a higher number of frequencies, however, as mentioned hereinabove, the increase of the number of rejected frequencies causes a loss of robustness that may rapidly become crippling.

Of course, the present invention is not limited to the particular embodiments that have just been described, but extends to all the variants and equivalents within the scope thereof. Therefore, it is understood that the invention may be declined according to many other possibilities without thereby departing from the framework defined by the description and the claims.

The invention claimed is:

1. A method for active control of mechanical vibrations by implementation of a control law including a central corrector and a Youla parameter configured to attenuate essentially mono-frequency mechanical vibratory perturbations created in a physical structure of a physical system by at least one rotary machine fixed by a support to said physical structure and rotating at a determinable speed of rotation, the frequency of the vibratory perturbations being linked to the speed of rotation of the rotary machine and varying as a function of the variations of said speed of rotation, at least one mechanical actuator being disposed between the rotary machine and the physical structure, as well as at least one vibration sensor (4) producing signals y(t) or Y(t) according to a mono-variable or multi-variable case, respectively, the use of one sensor corresponding to a mono-variable case and the use of several sensors corresponding to a multi-variable case, the at least one mechanical actuator being in series, in the support, or in parallel with the support, the at least one sensor being connected to at least one calculator controlling the at least one actuator, the calculator including a correction calculation means for producing control signals u(t) or U(t) according to a mono-variable or multi-variable case, respectively, for the at least one actuator as a function of measurements of the at least one sensor and of a vibratory perturbation frequency parameter, the calculation means being configured according to a correction control law corresponding to a block-modeling of the system, said blocks being those of the central corrector and of a Youla parameter block, the modeling being such that only the Youla parameter has coefficients that depend on the vibratory perturbation frequency in said correction control law, the central corrector having fixed coefficients, the Youla parameter being in the form of an infinite impulse response filter, the method comprising:

during a preliminary design phase,
determining and calculating the model parameters of the physical system part that includes the at least one actuator, the support, and the at least one sensor by stimulation of the at least one actuator and measurements by the at least one sensor, and the correction control law as a function of determined frequencies of vibratory perturbations, and storing at least the variable coefficients of the Youla parameters in a memory of the calculator, in a table; and during a use phase, in real time:
determining the frequency of the current vibratory perturbation, and
calculating the correction control law, comprising the central corrector with the Youla parameter, with the calculator using as the Youla parameter the memorized coefficients of a determined perturbation frequency corresponding to the current perturbation frequency, wherein in the mono-variable case, in the preliminary design phase, the method further comprises:

a) using, at a first time, a linear model of the physical system, which is in the form of a discrete rational transfer function, and determining and calculating said transfer function by stimulation of the physical system by the at least one actuator and measurements by the at least one sensor, then applying a linear system identification method with the measures and the model, b) implementing, at a second time, a central corrector, which is applied to the model of the physical system determined and calculated at the first time, and is in the form of a RS corrector of two blocks $1/So(q^{-1})$ and $Ro(q^{-1})$, in the central corrector, the block $1/So(q^{-1})$ producing the signal u(t) and receiving as an input the reverse output signal of the block $Ro(q^{-1})$, said block $Ro(q^{-1})$ receiving as an input the signal y(t) corresponding to the summation of the vibratory perturbation p(t) and of the output of the transfer function of the physical system model, and determining and calculating the central corrector, and c) in a third time, adding a Youla parameter to the central corrector to form the correction control law, the Youla parameter being in the form of a block $Q(q^{-1})$, an infinite impulse response filter, with $$Q(q^{-1}) = \frac{\beta(q^{-1})}{\alpha(q^{-1})},$$

$\alpha$ and $\beta$ being polynomials in $q^{-1}$, added to the central corrector RS, said Youla block $Q(q^{-1})$ receiving a perturbation estimation obtained by calculation from signals u(t) and y(t) and as a function of the transfer function of the physical system model and the output signal of said Youla block $Q(q^{-1})$ being subtracted from the reverse signal of $Ro(q^{-1})$ sent at the input of the block $1/So(q^{-1})$ of the central corrector RS, and then determining and calculating the Youla parameter in the correction control law, including the central corrector to which the Youla parameter is associated, for at least one vibratory perturbation frequency p(t), including at least the determined frequency of the vibratory perturbation to be attenuated, and, in the use phase, in real time:
determining the current frequency of the vibratory perturbation to be attenuated, and
calculating, by the calculator, the correction control law, comprising the RS corrector with the Youla parameter, using as the Youla parameter the coefficients that have been calculated for a vibratory perturbation frequency corresponding to the current frequency of vibratory perturbation to be attenuated, the coefficients of $Ro(q^{-1})$ and $So(q^{-1})$ being fixed.

2. The method according to claim 1, further comprising, in the preliminary design phase:
   a) in the first time, exciting the physical system by application to the at least one actuator of an excitation signal, whose spectral density is substantially uniform over a useful frequency band,
   b) in the second time, determining and calculating the polynomials $Ro(q^{-1})$ and $So(q^{-1})$ of the central corrector so that said central corrector is equivalent to a corrector calculated by placement of the poles of the closed loop in the application of the central corrector to the transfer function of the physical system model,
   c) in the third time, determining and calculating the numerator and denominator of the Youla block $Q(q^{-1})$ within the correction control law, for at least one vibratory perturbation frequency p(t), including at least the determined frequency of vibratory perturbation to be attenuated, and as a function of a criterion of attenuation, the block $Q(q^{-1})$ being expressed in the form of a ratio $\beta(q^{-1})/\alpha(q^{-1})$, $\alpha$ and $\beta$ being polynomials in $q^{-1}$, to obtain coefficient values of the polynomials $\alpha(q^{-1})$ and $\beta(q^{-1})$ for the/each of the frequencies, the calculation of $\beta(q^{-1})$ and $\alpha(q^{-1})$ being made by obtaining a discrete transfer function $Hs(q^{-1})/\alpha(q^{-1})$ resulting from the discretization of a continuous second order cell, the polynomial $\beta(q^{-1})$ being calculated by solving a Bezout equation, and in the use phase, in real time,
   determining the current frequency of the vibratory perturbation to be attenuated,
   calculating, by the calculator, is the correction control law, a fixed-coefficient central corrector with variable-coefficient Youla parameter, to produce the signal u(t) sent to the at least one actuator, as a function of the measures y(t) of the at least one sensor and using as the Youla block $Q(q^{-1})$ the coefficient values of the polynomials $\alpha(q^{-1})$ and $\beta(q^{-1})$ determined and calculated for a determined frequency corresponding to the current frequency.

3. The method according to claim 2, wherein as the physical system model, a transfer function is used, which is in the form of:

$$\frac{y(t)}{u(t)} = \frac{q^{-d}B(q^{-1})}{A(q^{-1})}$$

where d is the number of system delay sampling periods, B and A are polynomials in $q^{-1}$ of the form:

$$B(q^{-1}) = b_0 + b_1 \cdot q^{-1} + \ldots b_{nb} \cdot q^{-nb}$$

$$A(q^{-1}) = 1 + a_1 \cdot q^{-1} + \ldots a_{na} \cdot q^{-na}$$

the $b_i$ and $a_i$ being scalar numbers, and $q^{-1}$ being the delay operator of a sampling period, and the calculation of the vibratory perturbation estimation is obtained by application of the function $q^{-d}B(q^{-1})$ to u(t) and subtraction of result from the application of y(t) to the function $A(q^{-1})$.

4. The method according to claim 2, wherein for the time b), determining and calculating the polynomials $Ro(q^{-1})$ and $So(q^{-1})$ of the central corrector by a method of placement of the closed loop poles.

5. The method according to claim 1, wherein as the physical system model, a transfer function is used, which is in the form of:

$$\frac{y(t)}{u(t)} = \frac{q^{-d}B(q^{-1})}{A(q^{-1})}$$

where d is the number of system delay sampling periods, B and A are polynomials in $q^{-1}$ of the form:

$$B(q^{-1}) = b_0 + b_1 \cdot q^{-1} + \ldots b_{nb} \cdot q^{-nb}$$

$$A(q^{-1}) = 1 + a_1 \cdot q^{-1} + \ldots a_{na} \cdot q^{-na}$$

the $b_i$ and $a_i$ being scalar numbers, and $q^{-1}$ being the delay operator of a sampling period, and the calculation of the vibratory perturbation estimation is obtained by application of the function $q^{-d}B(q^{-1})$ to u(t) and subtraction of the result from the application of y(t) to the function $A(q^{-1})$.

6. The method according to claim 5, wherein for the time b), determining and calculating the polynomials $Ro(q^{-1})$ and $So(q^{-1})$ of the central corrector by a method of placement of the closed loop poles.

7. The method according to claim 1, further comprising, for the time b), determining and calculating the polynomials $Ro(q^{-1})$ and $So(q^{-1})$ of the central corrector by a method of placement of the closed loop poles.

8. The method according to claim 1, wherein the method is adapted to a set of determined frequencies of vibratory perturbations to be attenuated, and the time c) is repeated for each of the determined frequencies, and
   in the use phase, when none of the determined frequencies corresponds to the current frequency of vibratory perturbation to be attenuated, making an interpolation at said current frequency, for the coefficient values of the Youla block Q, based on the values of coefficients of said Youla block Q known for the determined frequencies.

9. The method according to claim 1, wherein the signals are sampled at a frequency Fe, and
   at time a), a useful frequency band of the excitation signal is used, which is substantially [0, Fe/2].

10. The method according to claim 1, further comprising, before the use phase, at the design phase, adding a fourth time of verification of the stability and robustness of the physical system model and of the correction control law, the central corrector with Youla parameter, previously obtained at times a) to c), by making a simulation of the correction control law obtained at times b) and c), applied to the physical system model obtained at time a), for the determined frequencies, and when a predetermined criterion of stability and/or robustness is not fulfilled, reiterating at least the time c) with modification of the criterion of attenuation.

11. The method according to claim 1, wherein the preliminary design phase is performed once, preliminary to the use phase, with memorization of the determination and calculation results for being used in the use phase.

12. The method according to claim 1, wherein the current frequency of the vibratory perturbation to be attenuated is determined from the measure of the speed of rotation of the rotary machine.

13. The method according to claim 1, wherein the physical system is an aircraft and the rotary machine is an aircraft engine.

14. A method for active control of mechanical vibrations by implementation of a control law including a central corrector and a Youla parameter configured to attenuate essentially mono-frequency mechanical vibratory perturbations created in a physical structure of a physical system by at least one rotary machine fixed by a support to said physical structure and rotating at a determinable speed of rotation, the frequency of the vibratory perturbations being linked to the speed of rotation of the rotary machine and varying as a function of the variations of said speed of rotation, at least one mechanical actuator being disposed between the rotary machine and the physical structure, as well as at least one vibration sensor (4) producing signals y(t) or Y(t) according to a mono-variable or multi-variable case, respectively, the use of one sensor corresponding to a mono-variable case and the use of several sensors corresponding to a multi-variable case, the at least one mechanical actuator being in series, in the support, or in parallel with the support, the at least one sensor being connected to at least one calculator controlling the at least one actuator, the calculator including a correction calculation means for producing control signals u(t) or U(t) according to a mono-variable or multi-variable case, respectively, for the at least one actuator as a function of measurements of the at least one sensor and of a vibratory perturbation frequency parameter, the calculation means being configured according to a correction control law corresponding to a block-modeling of the system, said blocks being those of the central corrector and of a Youla parameter block, the modeling being such that only the Youla parameter has coefficients that depend on the vibratory perturbation frequency in said correction control law, the central corrector having fixed coefficients, the Youla parameter being in the form of an infinite impulse response filter, the method comprising:

during a preliminary design phase,
determining and calculating the model parameters of the physical system part that includes the at least one actuator, the support, and the at least one sensor by stimulation of the at least one actuator and measurements by the at least one sensor, and the correction control law as a function of determined frequencies of vibratory perturbations, and
storing at least the variable coefficients of the Youla parameters in a memory of the calculator, in a table; and
during a use phase, in real time:
determining the frequency of the current vibratory perturbation, and
calculating the correction control law, comprising the central corrector with the Youla parameter, with the calculator using as the Youla parameter the memorized coefficients of a determined perturbation frequency corresponding to the current perturbation frequency,
wherein in the mono- and multi-variable case, in the preliminary design phase:
a) in a first time, using a linear model of the physical system, which is in the form of a state representation of matrix blocks H, W, G and $q^{-1} \cdot I$, G being a transition matrix, H being an input matrix, W being an output matrix and I the identity matrix, wherein said state representation is expressed by a recurrence equation:

$X(t+Te)=G \cdot X(t)+H \cdot U(t)$ $Y(t)=W \cdot X(t)$ with X(t): state vector, U(t): input vector, Y(t): output vector, and
determining and calculating said physical system model by stimulation of the physical system by the at least one actuator and measurements by the at least one sensor, then applying a linear system identification method with the measures and the model, b) in a second time,
implementing a central corrector, which is applied to the physical system model determined and calculated at the first time, and in the form of state observer and estimated state feedback that expresses iteratively $\hat{X}$, a state vector of the observer, as a function of Kf, a gain of the observer, Kc a vector of the estimated state feedback, and the physical system model determined and calculated at the first time:

$\hat{X}(t+Te)=(G-kf \cdot W) \cdot \hat{X}(t+Te)+H \cdot U(k)+kf \cdot (y(t+Te))$ with a control $U(t)=-Kc \cdot \hat{X}(t)$, and
determining and calculating said central corrector,
c) in a third time, adding a Youla parameter to the central corrector to form the correction control law, the Youla parameter being in the form of a mono- or multi-variable block Q, of state matrices AQ, BQ, CQ, added to the central corrector also expressed in a state representation form, block Q whose output subtracted from the output of the central corrector produces the signal U(t) and whose input receives the signal Y(t) from which is subtracted the signal W−X(t), and then determining and calculating the Youla parameter in the correction control law, including the central corrector to which the Youla parameter is associated, for at least one vibratory perturbation frequency P(t), including at least the determined frequency of vibratory perturbation to be attenuated, and
in the use phase, in real time:
determining the current frequency of the vibratory perturbation to be attenuated, and
causing the calculator to calculate the correction control law, including the fixed-coefficient central corrector with the variable-coefficient Youla parameter, using as the Youla parameter the coefficients that have been calculated for a vibratory perturbation frequency corresponding to the current frequency of vibratory perturbation to be attenuated.

15. The method according to claim 14, further comprising, in the design phase:
a) in the first time, exciting the physical system by application to the at least one actuator of excitation signals, whose spectral density is substantially uniform over a useful frequency band, the excitation signals being decorrelated with respect to each other,
b) in the second time, determining and calculating the central corrector to be equivalent to a corrector with state observer and state feedback, Kf being obtained by quadratic optimization (LQ), and the state feedback gain Kc chosen to ensure the robustness of the control law provided with the Youla parameter, by a quadratic optimization (LQ),
c) in the third time, determining and calculating the coefficients of the Youla block Q within the correction control law, for at least one vibratory perturbation frequency P(t), including at least the determined frequency of vibratory perturbation to be attenuated as a function of a criterion of attenuation, to obtain coefficient values of the Youla parameter for the/each of the frequencies, and
in the use phase, in real time,
determining the current frequency of the vibratory perturbation to be attenuated, and
causing the calculator to calculate the correction control law, fixed-coefficient central corrector with variable-coefficient Youla parameter, to produce the signal U(t) sent to the at least one actuator, as a function of the measures Y(t) of the at least one sensor and using as the Youla parameter the coefficient values determined and calculated for a determined frequency corresponding to the current frequency.

16. A device comprising:
a system active control of mechanical vibrations by implementation of a control law including a central corrector and a Youla parameter for attenuation of essentially mono-frequency mechanical vibratory perturbations created in a physical structure of a physical system by at least one rotary machine fixed by a support to said physical structure and rotating at a determinable speed of rotation, the frequency of the vibratory perturbation being linked to the speed of rotation of the rotary machine and varying as a function of the variations of said speed of rotation;

at least one mechanical actuator arranged between the rotary machine and the physical structure;

at least one vibration sensor producing signals y(t) or Y(t) according to a mono-variable or multi-variable case, respectively, the use of one sensor corresponding to a mono-variable case and the use of several sensors corresponding to a multi-variable case, wherein the at least one actuator is in series, in the support, or in parallel with the support, the at least one sensor is connected to at least one calculator of the device controlling the at least one actuator, the at least one calculator including correction calculation means producing control signal u(t) or U(t) according to a mono-variable or multi-variable case, respectively, for the at least one actuator as a function of measurements of the at least one sensor and of a vibratory perturbation frequency parameter, the calculator including calculation means configured according to a correction control law corresponding to a block-modeling of the system, said blocks being those of the central corrector and a Youla parameter block, the modeling being such that only the Youla parameter has coefficients that depend on the vibratory perturbation frequency in said correction control law, the central corrector having fixed coefficients, the Youla parameter being in the form of an infinite impulse response filter, during the preliminary design phase, having been determined and calculated the model parameters of the physical system part that includes the at least one actuator, the support, and the at least one sensor by stimulation of the at least one actuator and measurements by the at least one sensor, and the correction control law as a function of the determined frequencies of vibratory perturbations, and at least the variable coefficients of the Youla parameters are stored in a memory of the calculator, in a table, the device allowing, during the use phase, in real time, the determination of the frequency of the current vibratory perturbation and the calculation of the correction control law, including the central corrector with the Youla parameter, with the calculator using as the Youla parameter the memorized coefficients of a determined perturbation frequency corresponding to the current perturbation frequency, wherein in the mono-variable case, in the preliminary design phase, a) a linear model of the physical system, which is in the form of a discrete rational transfer function, is used at a first time, and the transfer function is determined and calculated by stimulation of the physical system by the at least one actuator and measurements by the at least one sensor, then a linear system identification method is applied with the measures and the model, b) a central corrector, which is applied to the model of the physical system determined and calculated at the first time, is implemented at a second time, the central corrector being in the form of a RS corrector of two blocks $1/So(q^{-1})$ and $Ro(q^{-1})$, in the central corrector, the block $1/So(q^{-1})$ producing the signal u(t) and receiving as an input the reverse output signal of the block $Ro(q^{-1})$, said block $Ro(q^{-1})$ receiving as an input the signal y(t) corresponding to the summation of the vibratory perturbation p(t) and of the output of the transfer function of the physical system model, and determining and calculating the central corrector, and c) a Youla parameter is added, in a third time, to the central corrector to form the correction control law, the Youla parameter being in the form of a block $Q(q^{-1})$, an infinite impulse response filter, with $$Q(q^{-1}) = \frac{\beta(q^{-1})}{\alpha(q^{-1})},$$

$\alpha$ and $\beta$ being polynomials in $q^{-1}$, added to the central corrector RS, said Youla block $Q(q^{-1})$ receiving a perturbation estimation obtained by calculation from signals u(t) and y(t) and as a function of the transfer function of the physical system model and the output signal of said Youla block $Q(q^{-1})$ being subtracted from the reverse signal of $Ro(q^{-1})$ sent at the input of the block $1/So(q^{-1})$ of the central corrector RS, and then the Youla parameter is determined and calculated in the correction control law, including the central corrector to which the Youla parameter is associated, for at least one vibratory perturbation frequency p(t), including at least the determined frequency of the vibratory perturbation to be attenuated, and, in the use phase, in real time:

the current frequency of the vibratory perturbation to be attenuated is determined, and the calculator calculates the correction control law, comprising the RS corrector with the Youla parameter, using as the Youla parameter the coefficients that have been calculated for a vibratory perturbation frequency corresponding to the current frequency of vibratory perturbation to be attenuated, the coefficients of $Ro(q^{-1})$ and $So(q^{-1})$ being fixed.

* * * * *